US009972230B1

(12) United States Patent
DeLorean

(10) Patent No.: US 9,972,230 B1
(45) Date of Patent: May 15, 2018

(54) TRAFFIC DISPLAY WITH VIEWING DISTANCE CONTROL

(71) Applicant: DELOREAN, LLC, Bloomfield Village, MI (US)

(72) Inventor: Jack Z. DeLorean, Bloomfield Village, MI (US)

(73) Assignee: DELOREAN, LLC, Bloomfield, MI (US)

( * ) Notice: Subject to any disclaimer, the term of this patent is extended or adjusted under 35 U.S.C. 154(b) by 0 days. days.

(21) Appl. No.: 15/363,540

(22) Filed: Nov. 29, 2016

Related U.S. Application Data

(63) Continuation-in-part of application No. 14/657,570, filed on Mar. 13, 2015, now Pat. No. 9,607,510, which is a continuation-in-part of application No. 14/022,141, filed on Sep. 9, 2013, now abandoned.

(60) Provisional application No. 61/699,992, filed on Sep. 12, 2012.

(51) Int. Cl.
| | |
|---|---|
| *G08G 1/09* | (2006.01) |
| *G09F 27/00* | (2006.01) |
| *G09F 21/04* | (2006.01) |
| *G08G 1/052* | (2006.01) |
| *G06Q 30/02* | (2012.01) |

(52) U.S. Cl.
CPC ....... *G09F 27/005* (2013.01); *G06Q 30/0241* (2013.01); *G08G 1/052* (2013.01); *G09F 21/04* (2013.01)

(58) Field of Classification Search
None
See application file for complete search history.

(56) References Cited

U.S. PATENT DOCUMENTS

| | | | | |
|---|---|---|---|---|
| 4,663,871 | A * | 5/1987 | Young | G09F 13/16 |
| | | | | 359/628 |
| 5,150,116 | A * | 9/1992 | West | G08G 1/095 |
| | | | | 340/905 |
| 6,060,993 | A | 5/2000 | Cohen | |
| 7,482,910 | B2 | 1/2009 | Melvin | |
| 9,607,510 | B1 * | 3/2017 | DeLorean | G08G 1/0137 |
| 2003/0046158 | A1 | 3/2003 | Kratky | |
| 2003/0144906 | A1 | 7/2003 | Fujimoto et al. | |

(Continued)

OTHER PUBLICATIONS

Clare Carter, "EU plans to fit all cars with speed limiters," The Telegraph, UK, Sep. 1, 2013, http://www.telegraph.co.uk/motoring/road-safety/10278702/EU-plans-to-fit-all-cars-with-speed-limiters.html, 2 pgs.

*Primary Examiner* — Brent Swarthout
(74) *Attorney, Agent, or Firm* — Lee & Hayes, PLLC

(57) ABSTRACT

A sign displays moving, still, or blank images. In one aspect the sign is mounted over a roadway for viewing by occupants of vehicular traffic and pedestrians. In another aspect the sign is mounted on a vehicle. An associated sensor senses the motion of traffic in the vicinity of the sign. When traffic moves at less than a predetermined speed, the sign displays moving or changing information. At greater speeds the display on the sign is either still or blank, so as to avoid distracting nearby drivers. An electronic system provides various aspects that augment sign operation such as GPS, reception of signage information for use in particular locations, advertiser billing information based on sign usage, and collection and reporting of demographics that aid advertisers in maximizing their impact.

20 Claims, 17 Drawing Sheets

(56) References Cited

U.S. PATENT DOCUMENTS

| | | | |
|---|---|---|---|
| 2006/0143956 A1* | 7/2006 | Star | G06Q 30/0264 40/584 |
| 2006/0229939 A1* | 10/2006 | Bhakta | G06Q 30/0265 705/14.62 |
| 2010/0002079 A1* | 1/2010 | Krijn | G02B 27/0093 348/148 |
| 2010/0036717 A1 | 2/2010 | Trest | |
| 2010/0063885 A1* | 3/2010 | Merkin | G06Q 30/0272 705/14.68 |
| 2010/0207961 A1* | 8/2010 | Zomet | G02B 27/2214 345/630 |
| 2011/0018738 A1* | 1/2011 | Feroldi | B60Q 1/503 340/905 |
| 2011/0106595 A1* | 5/2011 | Vande Velde | G06Q 30/02 705/14.4 |

\* cited by examiner

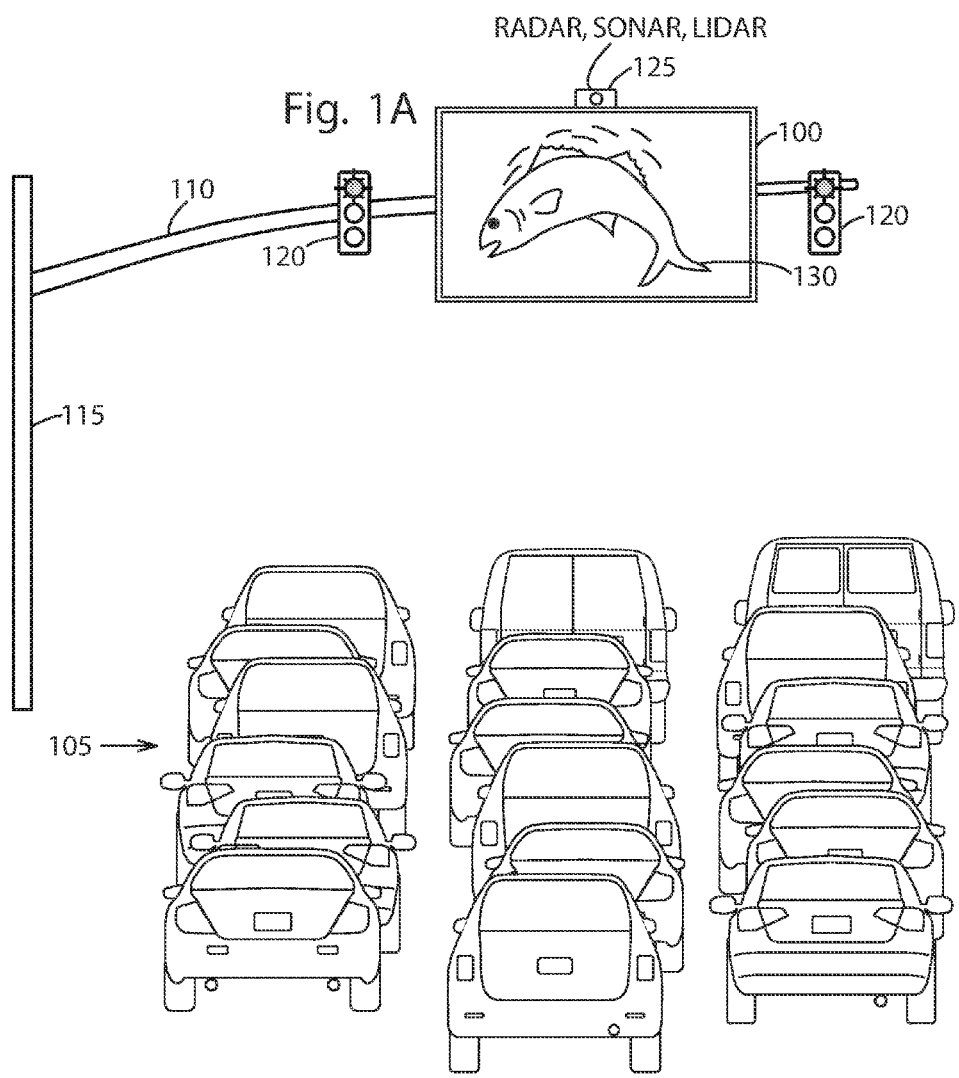
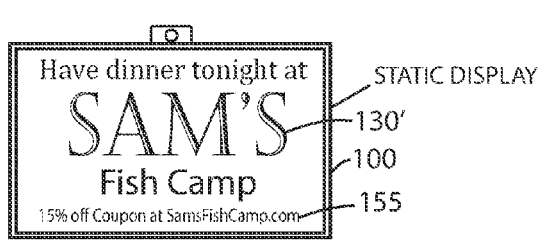

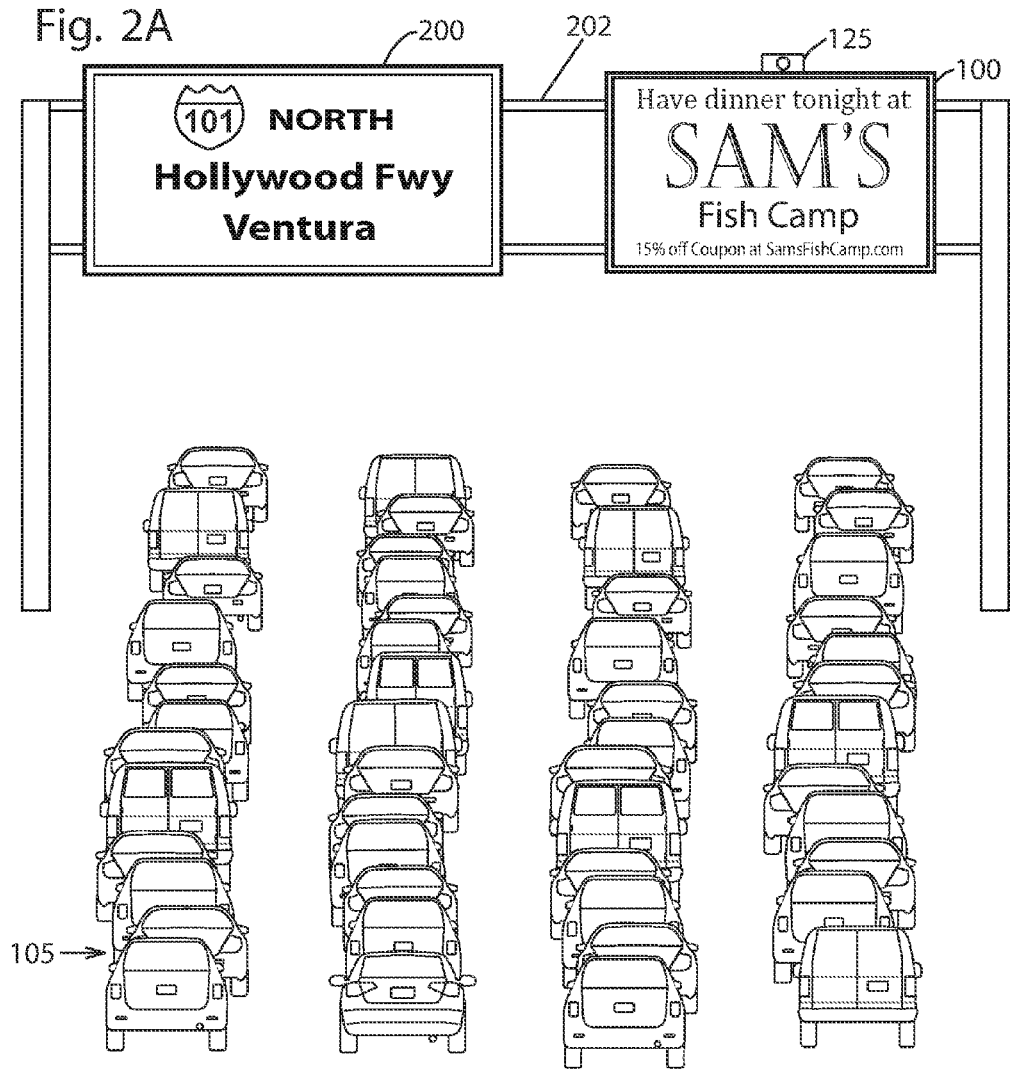

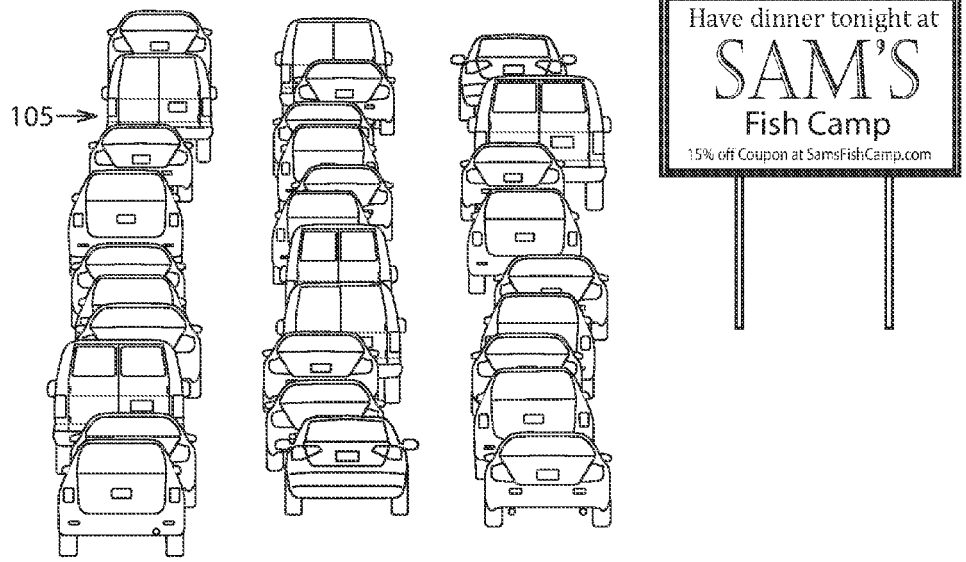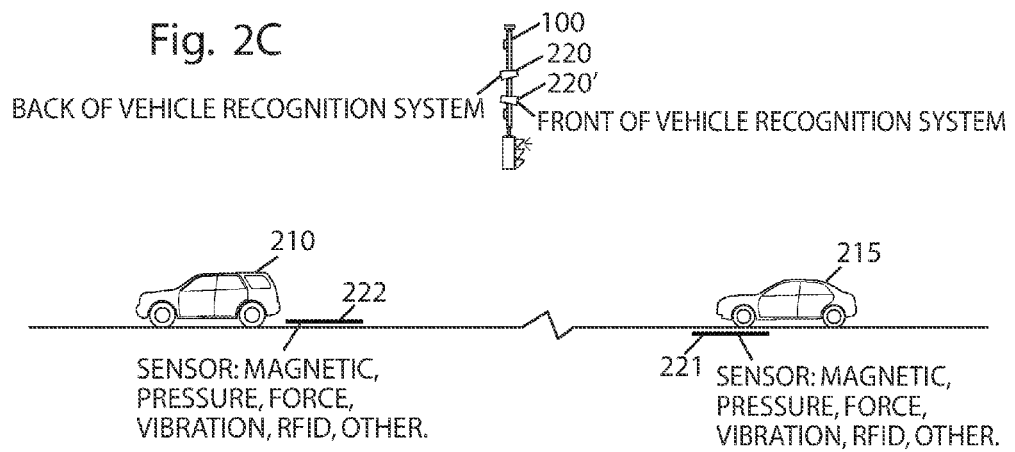

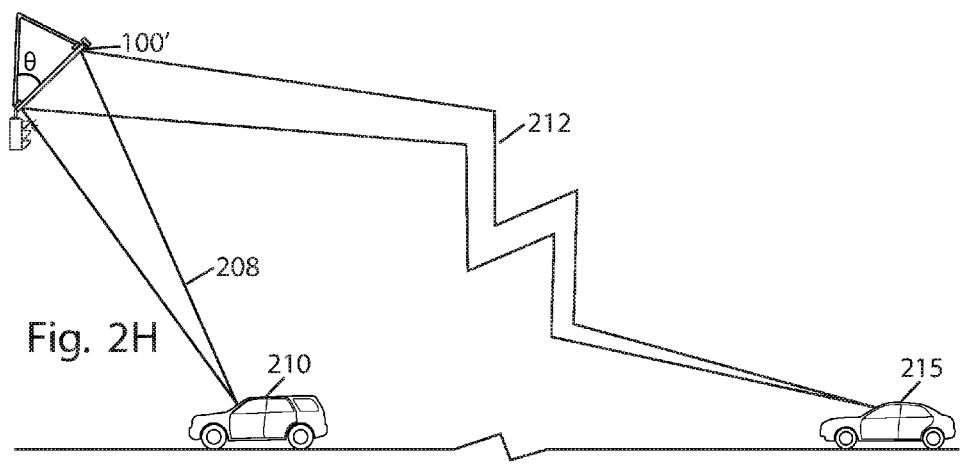
Fig. 2H
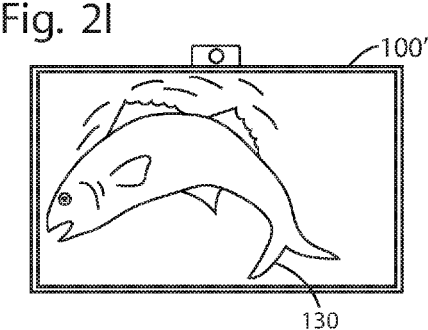
Fig. 2I
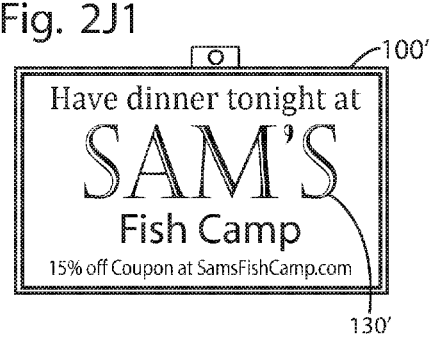
Fig. 2J1
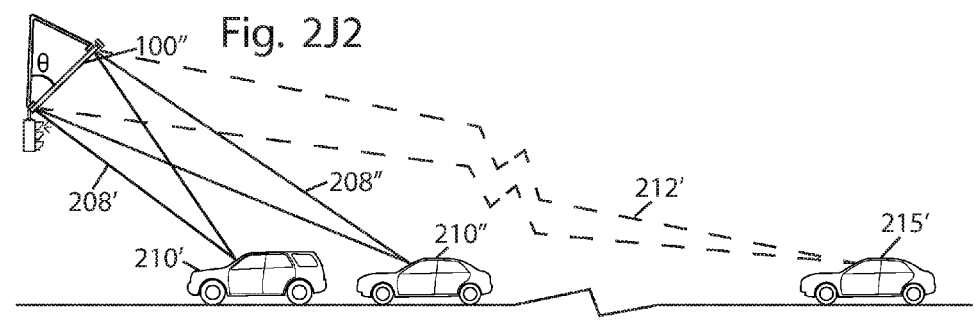
Fig. 2J2

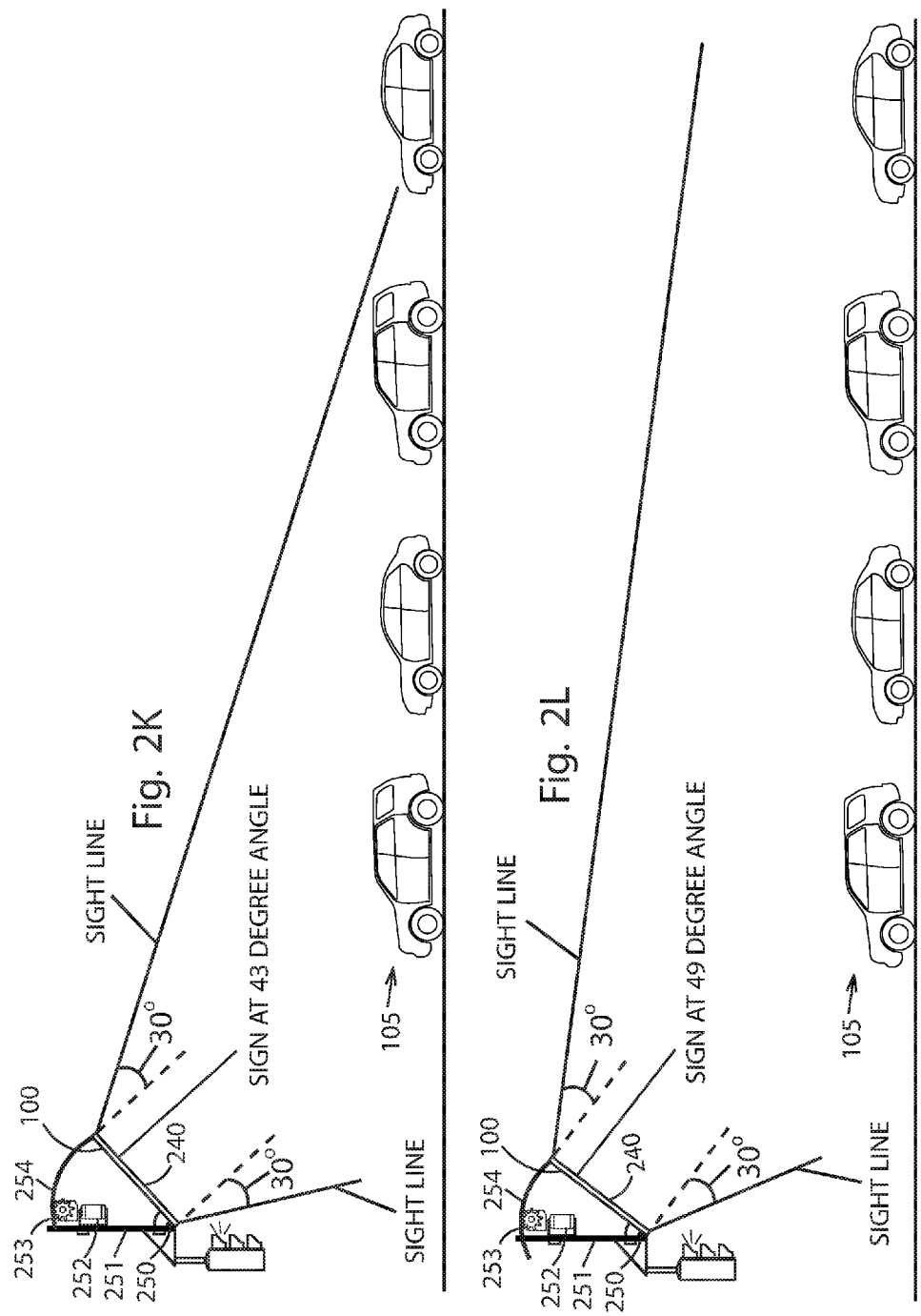

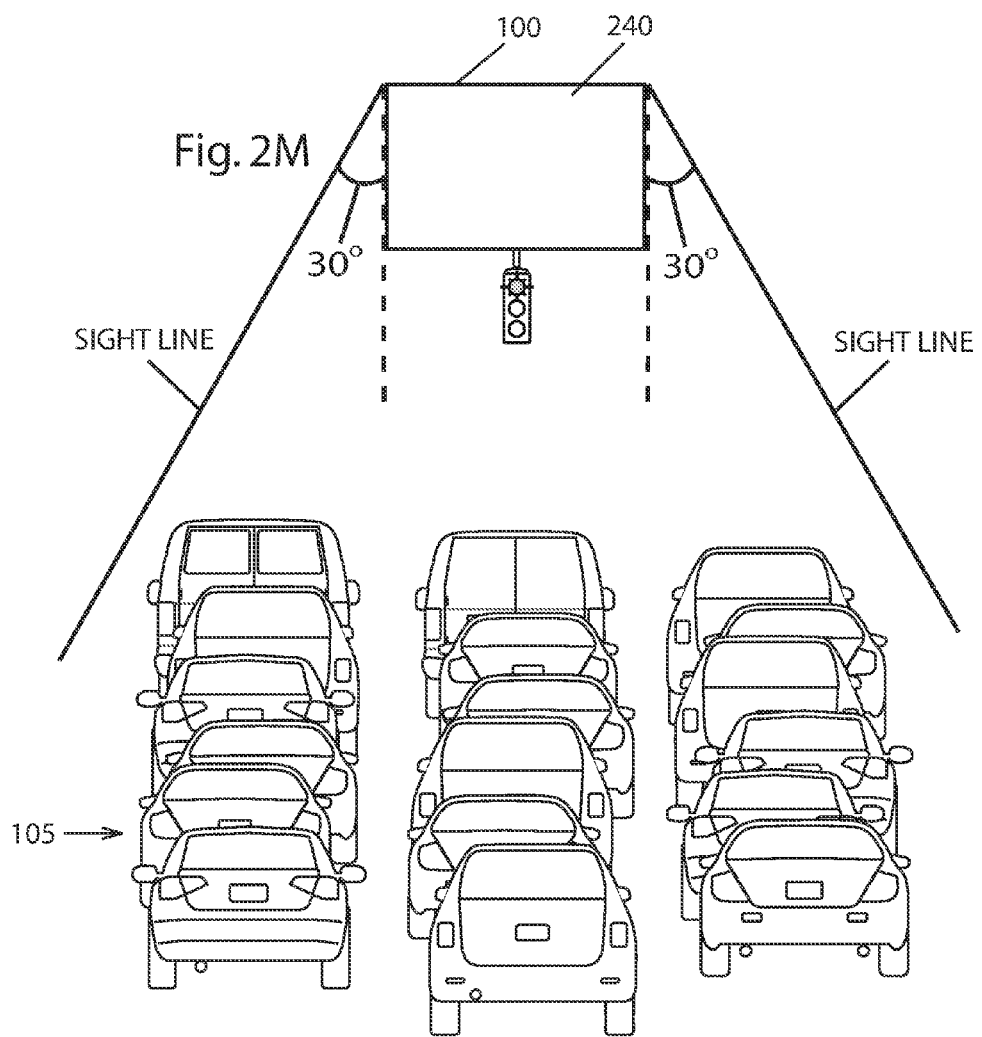

ACTIVE DISPLAY ON BUS

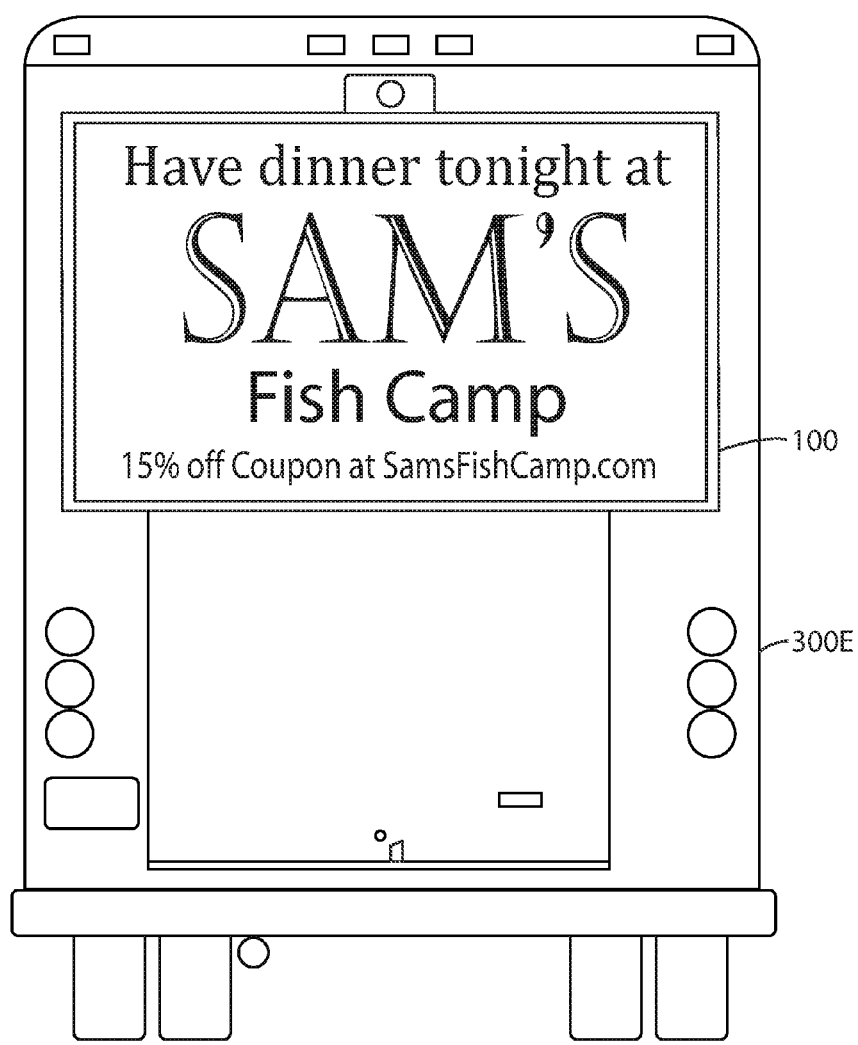
Fig. 8 — ACTIVE DISPLAY ON DELIVERY VAN

TRAFFIC DISPLAY WITH VIEWING DISTANCE CONTROL

CROSS-REFERENCE TO RELATED APPLICATIONS

This application is a Continuation-In-Part of application Ser. No. 14/657,570, filed Mar. 13, 2015, which is a Continuation-In-Part of application Ser. No. 14/022,141, filed Sep. 9, 2013, which claims priority of Provisional Application No. 61/699,992, filed Sep. 12, 2012, the disclosures of which are hereby incorporated in their entirety by reference herein.

BACKGROUND

Today's highly saturated television arena makes it increasingly difficult for advertisers reach their audiences in a cost-effectively manner. The advent of cable, satellite television, and hundreds of channels, as well as the fast growing popularity of digital video recorders, has induced merchants to spend more on advertising. However the proliferation of media lessens the number of viewers per medium and per advertising dollar. Studies show up to 40% of all advertising is wasted and TV advertising's return on investment today frequently yields only about 1 to 4%. Newspapers are in decline as well, as their advertising base dissipates. Clearly, there is a need for a more cost-effective advertising option.

One medium that I believe can be highly effective is electronic billboard advertising situated adjacent to roadways. The following is a list of some possibly relevant prior art that shows a variety of billboard displays. Following this list I provide a discussion of these references.

U.S. Patents

| Patent or Pub. Nr. | Kind Code | Issue or Pub. Date | Patentee or Applicant |
|---|---|---|---|
| 6,060,993 | B1 | 2000 May 9 | Cohen |
| 2003/0046158 | A1 | 2003 Mar. 6 | Kratky |
| 2003/0144906 | A1 | 2003 Aug. 31 | Fujimoto et al. |
| 2010/0036717 | A1 | 2010 Feb. 11 | Trest |
| 7,482,910 | B2 | 2009 Jan. 27 | Melvin |
| 2011/0018738 | A1 | 2011 Jan. 27 | Feroldi |

NON-PATENT LITERATURE

CLARE CARTER, "EU plans to fit all cars with speed limiters," The Telegraph, UK, Sep. 1, 2013, http://www.telegraph.co.uk/motoring/road-safety/10278702/EU-plans-to-fit-all-cars-with-speed-limiters.html In the references above, Cohen shows a mobile display system attached to vehicles such as buses and taxis. An on-board controller has satellite communication and senses time, date, and location and obtains and displays a static message suitable for the location. The network also transmits billing records.

Kratky shows a GPS-driven system that targets unique billboard ads to drivers on a particular path to a specified store.

Fujimoto et al. show a display mounted on a traveling vehicle. Data for the display is supplied from roadside antennas. The content can be ads customized for a particular geographic location. The display is seen by other vehicles on the road. The system collects identification and travel routes of paid drivers of the ad-displaying vehicles.

Trest shows a networked mobile display that displays signs and billboards on a moving vehicle. The display selection can be based on various criteria in the vicinity of the displaying vehicle, such as vehicle make, facial ID, body type, cell phone, and the like.

Melvin shows a billboard that displays advertising or other information keyed to a specific driver or vehicle. The system includes a camera that is directed toward a vehicle and that senses information about the vehicle, such as make, model, year, license plate, bumper sticker, etc. Then it causes a suitable message (advertising or information) for the driver or passengers of the subject vehicle to be displayed on a display device.

Cohen, Kratky, Fujimoto, and Trest all show fixed, i.e., not motion or video, context-based messages on a vehicle-mounted display. While their messages will be seen, they will not attract as much attention as a constantly changing video display and hence provide less advertising value.

Feroldi shows a display mounted on a vehicle or on a roadway. The display on the vehicle shows a moving or still image when the vehicle is stopped or is travelling below a threshold speed and inhibits the display or makes it static when the vehicle moves above the threshold speed so that the sign is readable. However Feroldi does not appear to disclose any way of controlling a roadway-mounted sign.

The Claire Carter article shows that The European Union currently plans to fit all cars with speed limiters in an effort to reduce deaths from vehicle crashes. Speed limiters use satellites, on-board receivers, sign-reading cameras or other means to limit vehicle speed to predetermined values.

SUMMARY

I have discovered a new method for controlling vehicle and roadside billboard displays that, in one aspect maximizes their advertising impact while minimizing distraction of drivers caused by their operation. Through control of the viewing angle of a privacy filter or a directional roadway display, more distant vehicle occupants that are outside this viewing angle are not able to see an active display, thereby avoiding driver distraction. However those within the viewing angle, in slowly moving or stopped vehicles, are able to view the active display. Further, the active display can be controlled by monitoring the speed of vehicles in the vicinity of the display. When the vehicles move faster than a predetermined speed the display is either made static or inhibited altogether, i.e., it is made blank. When vehicles move slower than the predetermined speed the display shows static, periodically changing, or active video information. Optionally, accompanying, short range FM radio transmissions, satellite radio, on line audio, cell phone audio, or another sound-based system can be broadcast in the proximity of the display to complement or supplement display activity.

BRIEF DESCRIPTION OF THE DRAWINGS

FIGS. 1A and 1B show a roadway display in its active and static conditions, respectively.

FIG. 2A shows an active display beside directional signage over a roadway.

FIG. 2B shows a free-standing roadside display.

FIG. 2C shows vehicle recognition systems attached to a roadway display.

FIGS. 2H through 2M show operation of an alternative display.

FIG. 5 shows an alternative aspect of a movable display attached to a vehicle.

FIGS. 7 and 8 shows active displays on a bus and a delivery van, respectively.

DRAWING REFERENCE NUMERALS

Figure 1C:
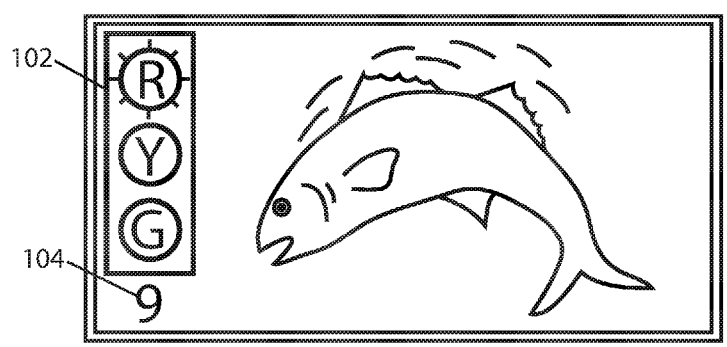
FIG. 1C shows an aspect in which the roadway sign includes a traffic stop light and countdown timer.

| 100 | Sign | 102 | Traffic signal display |
|---|---|---|---|
| 104 | Countdown display | 105 | Traffic |
| 110 | Arm | 115 | Stanchion |
| 120 | Signal light | 125 | Sensor |
| 130 | Display | 135 | System |
| 140 | Data resource | 141 | Data link |
| 142 | External data link | 143 | External traffic control logic |
| 145 | Computer | 146 | Manual control |
| 150 | Memory | 155 | Advertising |
| 170-190 | Blocks | 200 | Sign |
| 202 | Beam | 205 | Shutter |
| 208 | Sight line | 210 | Vehicle |
| 212 | Sight line | 215 | Vehicle |
| 220 | Vehicle recognition system | 221 | Sub-surface sensor |
| 222 | Surface sensor | 230 | Solar panel |
| 240 | Filter | 250 | Hinge |
| 251 | Frame | 252 | Drive assembly |
| 253 | Pinion | 254 | Rack |
| 300 | Vehicle | 305 | Hinge |
| 310 | Banner | 315 | GPS |
| 320 | Display portion | 325 | Broadcast system |
| 330 | Transmitter | 340-384 | Blocks |
| 400 | Deflector | 405 | Hinge point |
| 410 | Pivot arm | 415 | Pivot point |
| 500 | Pivot | 1000 | Post |
| 1005 | Pivot | 1010 | Arm |
| 1015 | Pin | 1020 | Spring |
| 1025 | Slot | | |

DETAILED DESCRIPTION

Description—First Embodiment—Sign on Stoplight Stanchion—FIGS. 1A Through 1E

FIG. 1A shows a sign 100 positioned over a roadway over which vehicular traffic 105 travels. In the present aspect, sign 100 is secured to a lateral arm 110 of a stoplight stanchion 115. Stanchion 115 is located at an intersection or other location where moving traffic must be periodically stopped. Arm 110 further includes one or more traffic signal lights 120 that direct traffic 105 to stop or go, in well-known fashion. In this aspect, a well-known above ground vehicle sensor 125 such as a radar (radio detection and ranging), sonar (sound navigation and ranging), lidar (light detection and ranging), infrared, video, or another vehicle-sensing system is affixed to sign 100. Sensor 125 can alternatively be secured to arm 110 or stanchion 115. Sensor 125 is oriented so that it detects the speed of vehicles 105 as they pass beneath sign 100. Sensor 125 is arranged to detect the motion of traffic within about 100 meters of sign 100, although other distances can be used. Sensor 125 provides a computer-sensible digital signal representative of the average or general speed of vehicles in traffic 105. A vehicle recognition system 220 (described below in connection with FIG. 2C) can be used in conjunction with or instead of sensor 125.

Sign 100 includes a visible display 130 that displays visual images through the use of any outdoor display, preferably an array or discrete and organic light-emitting diodes, or alternatively the display can use a plasma screen, a liquid-crystal screen, an electromechanical screen, a video projection screen, a mems (micro-electrical mechanical systems) projection display, etc.

Sign 100 can be seen by motorists in traffic 105 as they approach sign 100. Sign 100 receives information from a data resource or source 140 (FIG. 1D) that in turn receives information to be displayed via satellite, radio, television, Internet, or hard-wired connection, or a locally installed memory device, or another data resource in well-known fashion. Resource 140 is also used to receive and relay information about the use of system 135 (or 135', FIG. 3B) for billing and informational purposes. For example the number of seconds sign 100 displays advertising material for a particular advertiser can be recorded and stored or forwarded from resource 140 so that the advertiser can be billed for the amount of time his message was actually displayed. Billing is based on an algorithm comprising one or more weighted factors, including time of day, duration of message exposure, direction of exposed traffic, day of week, holiday impact, local special events, weather conditions, location of display or GPS determined location of mobile display, demographics of vehicle/occupants, geographical demographics and the demand for advertising at this particular location.

In FIG. 1A, display 130 on sign 100 is shown as a moving video display. FIG. 1B shows display 130' on sign 100 as a static display, i.e., the image in display 130' does not change with time. In one aspect, static display 130' is blank, i.e. it contains no visible information and can be either illuminated, i.e., with a color, grey, or dark. Display 130' is blank or dark when no paid advertising information is available for display 130', or when local authorities require this to be the case, for example. Sensor 125 is atop sign 100, although it can be on the sides, bottom, or even built into sign 100.

While traffic signal 120 in FIG. 1A is separate from display 100, it can be incorporated into sign 100 as shown by traffic signal 100 in FIG. 1C where colored lights Red, Yellow, and Green indicate "stop", "caution", and "go" instructions to traffic 105. A countdown display 104 indicates the time remaining in seconds until a "green" or "go" signal or until display 102 changes.

Figure 1D:
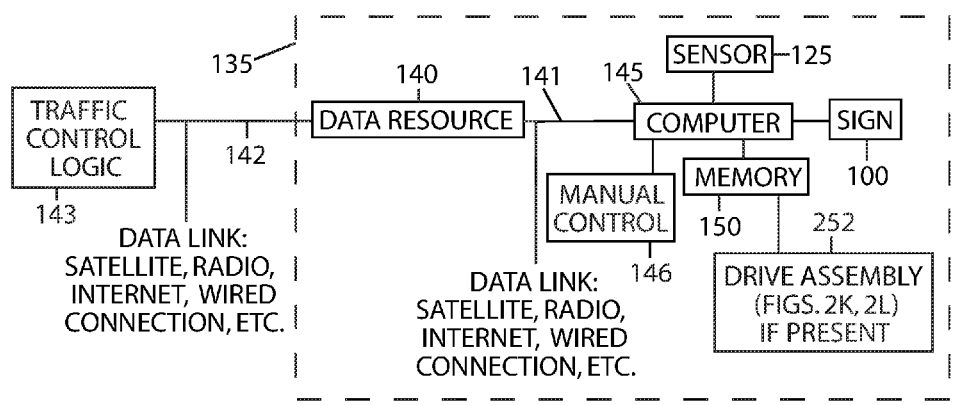
FIG. 1D shows one aspect of an electronic control system.

FIG. 1D shows an electronic system 135 for controlling sign 100. System 135 and sign 100 are energized by local power mains or batteries that are fed by electrical sources such as solar panels 230 (FIG. 2D) that receive solar energy.

System 135 comprises data resource 140, a computer 145, a memory 150, sign 100, and sensor 125.

Resource 140 contains programmed instructions for the operation of sign 100 and one or more images 130, 130' (FIG. 1A), etc. Resource 140 is a slave computer with a memory that receives information sent to it from another computer. The information it receives controls operation of signs 100, broadcasts, and the like from any remote source (not shown) such as another computer connected via the Internet. An external data link 142, such as a satellite link, radio, Internet, or wired connection, connects resource 140 to external traffic control logic, that provides traffic signal control timing for traffic control signal 102 and countdown display 104. In one aspect, when resource 140 receives a "green" or "go" signal from logic 143 programmed instructions within resource 140 cause sign 100 to display a static image so that drivers of vehicles in traffic 105 are not distracted.

Computer 145 contains a microprocessor or other logic (not shown) that obtains information from resource 140 and stores it in a memory 150. Computer 145 then retrieves these programmed instructions as needed, and at least one or more images 130, as described below in connection with FIG. 3C. Computer 145 also receives signals representative of the speed of vehicles in traffic 105 from sensor 125 as the vehicles approach sign 100.

Operation—First Embodiment—FIGS. 1A Through 1E

When sign 100 is energized, sensor 125 monitors the speed of vehicles in traffic 105 within a predetermined distance as they approach sign 100 and feeds data compatible with this speed to computer 145. When a traffic signal is green or any vehicle reaches a predetermined relatively high speed, for example 40 km/h, the programmed instructions in memory 150 cause static display 130' (FIG. 1B) to be retrieved from memory 150 and routed to sign 100 for display. Static display 130' can be either a graphic or blank. A static display is used when traffic is moving relatively fast because drivers travelling at this speed do not have time to follow a moving advertisement or display and can be unduly distracted.

Conversely, upon receiving data from sensor 125 that indicates vehicles 105 are moving relatively slowly, for example 8 km/h or less, computer 145 retrieves moving information for display 130 (FIG. 1A) from memory 150 and routes it to sign 100. A moving display may be used at a predetermined relatively low speed such as stop-and-go rush-hour traffic when drivers have time to follow the message and are not likely to be unduly distracted. Although speeds of 8 and 40 km/h are used in this example, any other predetermined speeds can be used. Certain locales may legislate the speeds, times of day, etc. when signs may be active, static, or blank. In one aspect, the embodiment has a manual override control 146 that permits manual control of the signs for emergencies and events (such as parades) so that officials can take control in real time, or for a predetermined period, after which the system is re-enabled. Control 146 is a panel-mounted or hand-held rotary switch, or the equivalent. This information is provided and controlled by resource 140.

Resource 140 sends updated display information to computer 145 at a predetermined rate so that displays 130 and 130' always show the latest information. Display 130' can include subordinate or short-term advertising as indicated at 155 in FIG. 1B. For example, an advertiser may wish to offer discounts in order to attract business at slow times of the day. If traffic control signal 102 and countdown display 104 are present, connection 142 (FIG. 1D) receives signals from traffic control logic 143 and passes these signals to computer 145.

Optional short range FM or other broadcasting continues throughout the cycling of a moving and static or blank display.

Figure 1E:
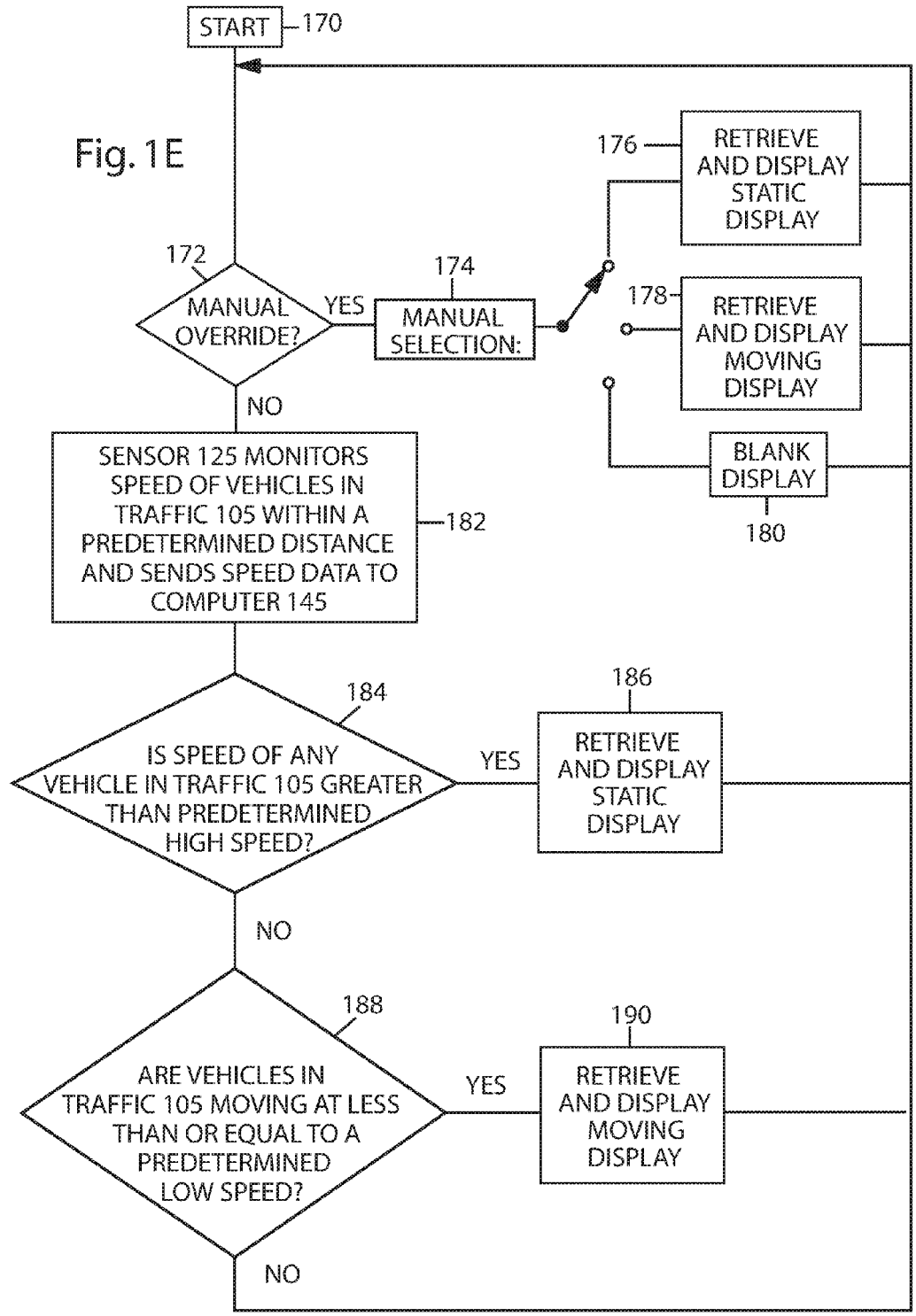
FIG. 1E is a block diagram showing one aspect of operation of the roadway display.

FIG. 1E is a flowchart showing one aspect of operation of the present embodiment. Instructions for this mode of operation are contained in memory 150 of computer 145. At the start (block 170) sign 100 and system 135 are energized. When manual override is selected by switch 146, the operator (not shown) makes a manual selection (block 174) and chooses to retrieve and display a static display (block 176), to retrieve and display a moving display (block 178), or to blank the display on sign 100 (block 180). If manual override is not selected (block 172), computer 145 receives information about the speed of vehicles in traffic 105 via sensor 125 (block 182). If traffic 105 is moving faster than a predetermined speed (block 184), computer 145 retrieves a static display from memory 150 and displays it (block 186). If vehicles in traffic 105 are moving at less than or equal to a predetermined speed (block 188), computer 145 retrieves a moving display from memory 150 and displays it. After a selection made at each choice point (blocks 172, 184, and 188) control of this aspect of the program running in computer 145 returns to the first choice, i.e., manual override (block 172). Operation of sign 100 continues this way until it is de-energized.

Description & Operation—Optional Sign Placements on Roadways—FIGS. 2A, 2B

FIG. 2A shows a roadway directional sign 200 accompanied by an advertising and/or informational sign 100. Sign 100 is mounted beside sign 200 on beam 202. As in the first example, sensor 125 detects the speed and direction of traffic 105 and relays speed data to computer 145 (FIG. 1D) which determines whether moving display 130 or fixed display 130' will be shown on sign 100.

In this application, sign 100 can also be used to display roadway information such as "Caution! Slow traffic for the next 5 miles." Or it can provide information such as that contained in well-known "Amber Alerts", i.e., public service alerts about the welfare of children.

In lieu of being placed overhead, sign 100 can be mounted in a free-standing manner beside a roadway, as shown in FIG. 2B.

FIG. 2C shows the addition of vehicle recognition sensors 220 and 220' in the vicinity of sign 100, regardless of where it is mounted. Such sensors are made by the Thales Group of Neuilly-sur-Seine Cedex, France, and Perceptics Imaging Technology Solutions of Knoxville, Tenn. These units comprise cameras and software for the recognition of license plates on vehicles. Sensor 220 is positioned to capture the rear license plate information after a vehicle 210 has passed beneath sign 100. Sensor 220' is arranged to capture the front license plate information as a vehicle 215 approaches sign 100. License plate information and the related model and year of each vehicle are used to determine driver demographics and deliver selective advertising. Additionally, vehicle ownership records cross indexed with available email and/or Internet addresses facilitate delivery of advertising content specific to the internet search history of vehicle occupants in much the same way as a search engine uses stored search information to provide targeted advertising. Presently available facial recognition software can be added to these systems in order to identify occupants of vehicles for the gathering of demographics and the tailoring of images 130 in signs 100 to that group. Vehicle recognition systems can also be used in identifying vehicles through windshield tags, RFID (radio-frequency identification) tags or other vehicle recognition systems, yielding general demographic information about the occupants. Recognition systems 220 and 220' are part of data resource 140 (FIG. 3B).

In addition to the above vehicle-recognition sensors, additional sensors that count and provide other information about passing vehicles may be employed. FIG. 2C also shows such sensors as surface and subsurface sensors 222 and 221, respectively. These sensors determine the number of vehicles that have entered a designated area adjacent to a red (stop) light, for example ten vehicles deep in three lanes. Sensors 221 and 222 are connected to computer 145 (FIG. 3B) and indicate the number and speed of vehicles in traffic 105. Upon reaching a specified number of vehicles, all of which are assumed to be stopped or moving very slowly, computer 145 causes display 100 to be activated. This display is viewable by occupants in the vehicles, and then deactivated upon a green (go) light. Sensors 221 and 222 comprise optical, magnetic, force, pressure, and vibration sensors and are used with all signage configurations described herein. Many vendors supply these roadway sensors. For example, magnetic sensors are sold by the Honeywell Corporation of Morristown, N.J., USA, optical sensors and counting devices are sold by Jamar Technologies, Inc., of Hatfield, Pa., USA. and others.

Vehicle mounted black box systems and/or RFID tags (not shown) that transmit vehicle data to roadside, road surface, or road-embedded sensors can also be used to demographically identify vehicle occupants or to serve to determine vehicle count within a defined area, in connection with sign activation.

Description & Operation—Additional
Embodiments—FIGS. 2D Through 2M

FIGS. 2D through 2I show means for selectively revealing a sign or portions of a sign to viewers at predetermined distances. FIGS. 2D through 2G show a plurality of shutters 205 on a sign 100.

Figure 2D:
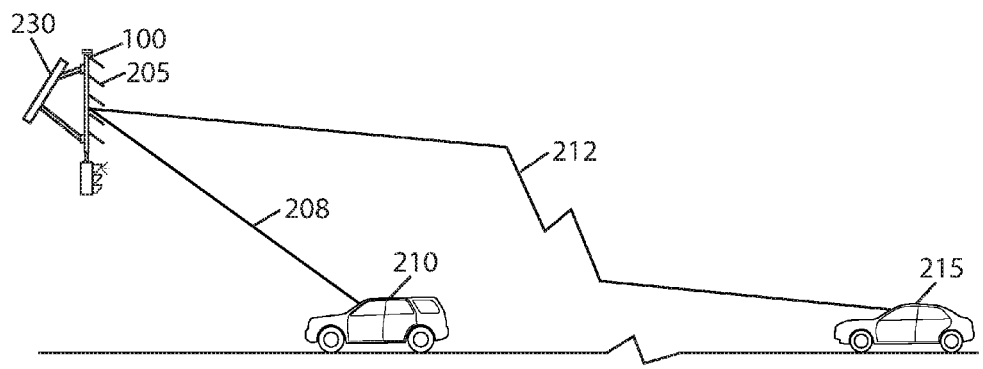
FIGS. 2D through 2G show the addition of shutters to a roadway display.

FIG. 2D includes a solar panel 230 to provide additional energy for driving sign 100.

Figure 2E:
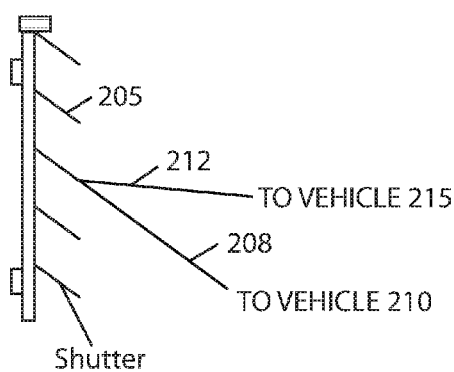
Figure 2F:
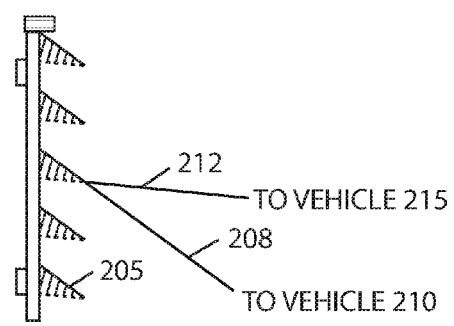

In FIGS. 2D to 2F two representative vehicles 210 and 215 are located at different distances from sign 100. Vehicle 210 is near sign 100 and vehicle 215 is farther away. Shutters 205 extend the width of sign 100 and are of a sufficient number, length, and angle with respect to sign 100 and the distance between sign 100 and vehicle 210 so that occupants in vehicle 210 are able to clearly see images on sign 100. Vehicle 215 is at a greater distance from sign 100 than vehicle 210 and the disposition of shutters 205 is such that shutters 205 largely block the view of sign 100 from occupants in vehicle 215. A pair of sight lines 208 and 212 from vehicles 210 and 215 to sign 100 indicate the portions of sign 100 that are visible at the two vehicular distances.

FIG. 2E is a side view indicating the portions of sign 100 visible to occupants of vehicles 210 and 215. Sight lines 208 and 212 meet and cross at the outer edge of shutters 205. All of sign 100 is visible to the occupants of vehicle 210 while the cross-hatched regions under shutters 205 are not visible to occupants of vehicle 215.

FIG. 2F is a side view of sign 100 with cross-hatching showing the portion of sign 100 that is not seen by vehicle 215.

Figure 2G:
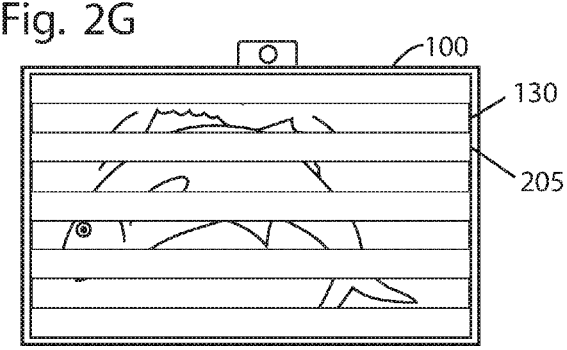

FIG. 2G is a frontal view of sign 100 showing the portions of sign 100 that are seen by vehicle 215 in the present aspect.

Simple geometry determines the relationship between the variables of shutter number, length, and angle as a function of the distance of vehicles 210 and 215.

FIGS. 2H through 2L show additional means of preventing an observer outside of a predetermined distance range from the sign from viewing the image on the sign, or conversely, allowing the image to be viewed only by observers within a predetermined distance range from the sign. This is accomplished by allowing observers within a predetermined vertical angular range of the sign to view the image. I.e., only observers who view the sign within a predetermined range of viewing angles measured in a vertical plane which is perpendicular to the sign, display panel, or surface of the sign will be able to view its image. These enabled observers will be within a predetermined distance range from the sign. Observers who view the sign from outside this distance range will be outside the predetermined range of viewing angles and will not be able to see the image.

FIGS. 2H through 2J1 show a sign 100' that projects two different images, each at a predetermined angle with respect to the plane of the display. This aspect of the present embodiment employs a technology that has been developed by Sharp Electronics, of Japan. This technology, called the "Sharp Dual Directional Viewing LCD" splits the light into left-of-center and right-of-center images within the display. A viewer positioned to the left of center of the display sees a first image, while a viewer positioned to the right of center of the same display sees a second image. In the present aspect, this dual directional viewing LCD, and hence its displayed dual images are both rotated 90°, so that instead of horizontal left-and-right viewing, the sign presents two images that are displaced vertically from one-another. I.e., observers at different vertical angles—and hence different distances—from the plane of the sign will see two different images.

FIG. 2H shows vehicles 210 and 215 and sight lines 208 and 212 as in the previous example. FIGS. 2I and 2J1 show an active image 130 and a static image 130' that are seen by occupants in vehicles 210 and 215, respectively. The longer sight line 212 and the ground below have a zigzag portions to indicate that the distance from vehicle 215 to sign 100 is compressed. Sign 100' is tilted at a predetermined angle θ from the vertical in this example to better enable selection and fine-tuning of sight line angles for vehicles 210 and 215. However all signs can be at other angles, including vertical (90° from the horizontal). The same manufacturer has announced a "Triple Directional Viewing LCD". This LCD provides three sight lines, instead of two for even greater viewing options. These signs, termed multi-directional viewing signs, enable the simultaneous viewing of a plurality of images, a blank screen, or a dark screen by occupants of vehicles at predetermined distances from the signs.

This same manufacturer has also produced a "Switchable Viewing-Angle Liquid Crystal Display". This display provides a narrow viewing angle so that a viewer positioned to the left or right of center of the display sees no image, while a viewer positioned at or near the center with an approximate right angle view of the display is able to view an image. Such a directional viewable LCD display 100" is shown in FIG. 2J2 rotated 90° so that it will be viewable only by vehicles within a predetermined range of vertical viewing angles. I.e., the occupants of a vehicle 210', which is relatively close to display 100", will view the display at relatively large vertical angle (nearly 90°) as measured from the plane of the sign and thus will see the displayed message. The sign will also be viewable by the occupants of vehicle 210' when it is within a range of other close distances or large angles (around 90°) to the display. However the occupants of a vehicle 215', which is relatively distant from display 100" and outside the range of viewable distances and angles, will view the display at a relatively smaller vertical angle from the sign and thus will not be able to view the displayed image. At present for sign 100" that is mounted at the approximate angle shown (angle θ is about 40°), the viewable distance range may be from about 9 m. to about 21 m. from the ground directly under the sign, where the viewable angular range depends on the height of the sign.

FIGS. 2K and 2L show sign 100 with predetermined restricted viewing angles. Whereas the sign in FIG. 2J2 illustrates an electronic technology to restrict viewing of a sign according to a viewer's distance therefrom through restricting of a viewing angle. FIGS. 2K and 2L, show an embodiment employing a film overlaid on a sign that can be tilted to restrict the viewing angle. In these aspects, viewing angles for vehicles 105 are restricted by the use of a privacy filter, such as the model ALCF-P ABR2, sold by 3M Company, of Minneapolis, Minn., USA. This filter is placed in front of and parallel to sign 100. It comprises a plastic film that contains a plurality of louvers. At large vertical angles, i.e., nearly 90° or perpendicular to the surface of the sign, most of the light from the sign passes through the filter so as to be viewable by observers, such as those in vehicle 105, who are close to the sign. At smaller viewing angles that are relatively far from or perpendicular to the sign, nearly all light from the sign will be blocked by the louvers. Thus the image on sign 100 can be selectively shown to vehicles nearer or farther away from sign 100 by tilting sign 100 to predetermined angles. E.g., to allow only vehicles close to sign 100 to view the information on the sign, it would be tilted down so that such vehicles would see it since their line of sight is generally perpendicular to the sign. To let only vehicles far from the sign see the information the sign, it would be tilted up. In these figures filters 240 are oriented so that sign 100 is visible only by viewers who are relatively close to the sign. By tilting sign 100 from a 43° angle to the ground or horizontal plane (FIG. 2K) to a 49° angle (FIG. 2L), for example, the sign becomes visible at a greater distance.

FIG. 2M shows a filter 240 oriented so that sign 100 is visible over a horizontal angular range of 30° to either side of a plane perpendicular to the sign.

In addition to the horizontal or vertical filters, two of filters 240 can be combined in series and at right angles to each other (not shown) so that sign 100 is visible within a narrow region bounded by 30° vertical and horizontal. Other angular ranges can be used.

In all of the preceding examples, sign 100 can be oriented vertically (so that the plane of sign 100 is perpendicular to the plane of the roadway beneath) or at other angles. In FIGS. 2K and 2L, sign 100 is mounted on a frame 251 that is secured to an arm 110 that extends from a stanchion (FIG. 1A), or another mounting arrangement that supports frame 251. A hinge 250 is positioned at the lower edge of sign 100, connecting sign 100 to frame 251 and permitting sign 100 to tilt downward at a predetermined angle. A drive assembly 252 comprises a motor and gearbox that is rotatably connected to a pinion gear 253. Assembly 252 is secured to frame 251 near the upper edge of sign 100. A curved rack gear 254, having a radius of curvature equal to the height of sign 100, is attached to sign 100 at one end and engages pinion gear 253 on drive assembly 252. When drive assembly 252 is energized, pinion gear 253 rotates, urging gear 253 to move and thereby rotate the plane of sign 100.

When the sign is vertical or at 90° with respect to the roadway beneath, as shown in FIG. 1, sign 100 is seen from the greatest distance, i.e., the maximum audience, by occupants in vehicles 105. When tilted at 49° to the ground, as shown in FIG. 2L, sign 100 is seen by occupants in fewer vehicles; and when tilted at 43°, as shown in FIG. 2K, still fewer occupants are able to see sign 100.

This selection of the size of the viewing audience is useful in maximizing display exposure at different times for use with a tilted display as well as other configurations described. For example, during rush hour, if it is known that vehicles within a depth of ten vehicles will be stopped or slowly moving within six seconds of a red light, sign 100 can be tilted so that its viewing range is limited to the depth of ten vehicles and then activated following those six seconds.

In addition to LCD signs, various other technologies, such as light-emitting diode signs, can be utilized in some of these same applications.

Drive assembly 252 is energized by instructions from computer 145 (FIG. 1D). If drive assembly 252 contains a well-known stepper motor, the angle of sign 100 is determined by counting the number of energizing pulses applied to the motor. If another type of motor, i.e. a DC or an AC motor, a feedback mechanism (not shown) such as a rotary encoder provides this angular information to computer 145. The energy source used for sign 100 also powers drive assembly 252. Sign 100 with its attached panel 240 can be tilted at any angle from 0 to 90° with respect to the plane of the roadway beneath.

This same arrangement is used with shutters 205 on sign 100, as shown in FIGS. 2D through 2G, with plain signs, such as in FIG. 1A as well as a dual directional viewing sign as shown in FIG. 2H.

Description & Operation—Second Alt.
Embod.—Sign on Vehicle—FIGS. 3A & 9A

Mounting sign 100 on a vehicle provides additional targeted advertising capabilities. A global positioning system (GPS) is added, along with location-targeted advertising.

Swing-Up Sign Mounted on the Rear of a Vehicle

Figure 3A:
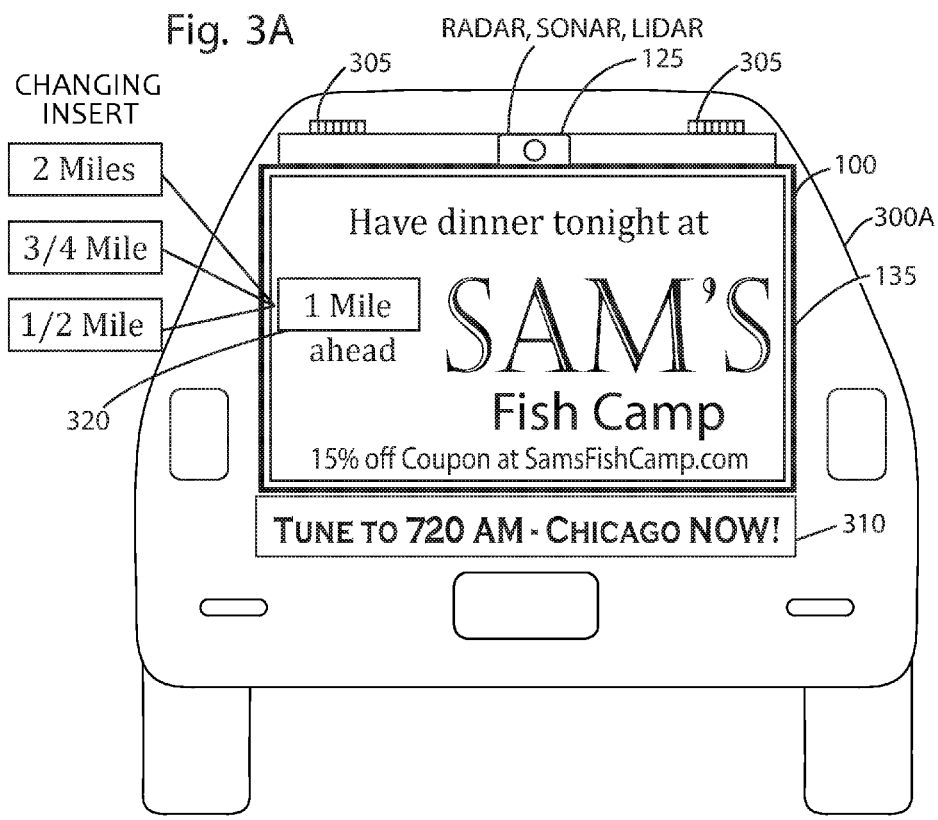
FIG. 3A shows one aspect of a passenger-vehicle-mounted display.
Figure 3B:
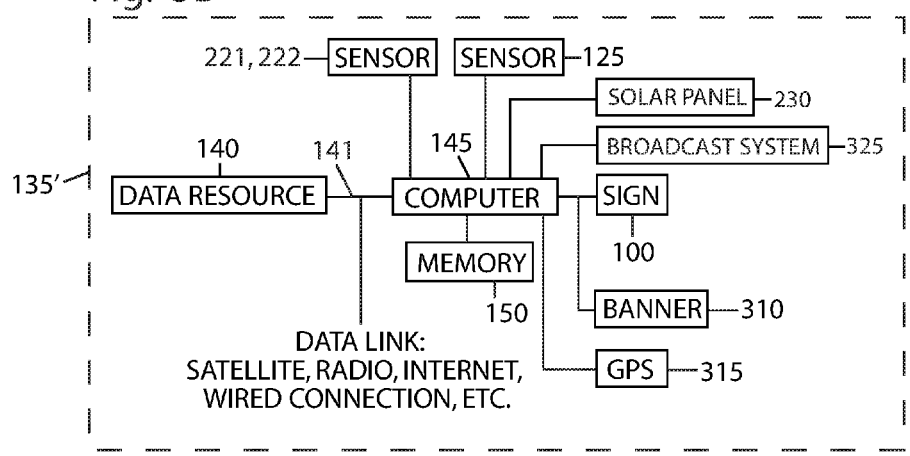
FIG. 3B shows an electronic control system adapted for use in moving vehicles.

FIG. 3A shows a vehicle 300A with a sign 100 mounted on its rear end. Sign 100 is optionally mounted on vehicle 300A by one or more hinges 305 that allow sign 100 to be lifted up and away from the rear of vehicle 300A for access to the rear of the vehicle. In normal use, sign 100 is positioned fully downward as shown and secured in that position by springs within hinges 305 or a latching mechanism (not shown).

An additional banner sign 310 is shown affixed to the rear of vehicle 300A. Sign 310 displays additional messages in a similar manner as sign 100. This banner can also be displayed as a "crawler" or moving sign (not shown) along the bottom of sign 100, as such are commonly know in television broadcasting. In particular, it can display time-sensitive information such as would direct a viewer to tune in to a short range FM broadcast or select a particular radio station, although other messages can be displayed.

FIG. 3B shows an electronic control system 135' which is similar to system 135 (FIG. 1C), but which also controls the operation of banner 310 and, in one aspect, receives location data from an included GPS 315. In one aspect, system 135' further receives a portion of its operating energy from a solar panel 230. In another aspect, system 135' further includes a short-range FM, AM, and cell phone broadcast system 325 that transmits information associated with display 130 on sign 100.

GPS 315 provides location data to computer 145 as vehicle 300A moves from one location to another. Computer 145 receives location-specific information from data resource 140 and is programmed to cause sign 100 and banner 310 to display this information (135 or 135') in either a moving form or a static (visual or blank) form, depending on the speed of vehicle 300 and the other vehicles 105 (FIGS. 1 and 2) in its vicinity. In addition, a portion 320 of display 135 is devoted to displaying location-sensitive information, such as proximity to a predetermined business or other venue.

Figure 3C:
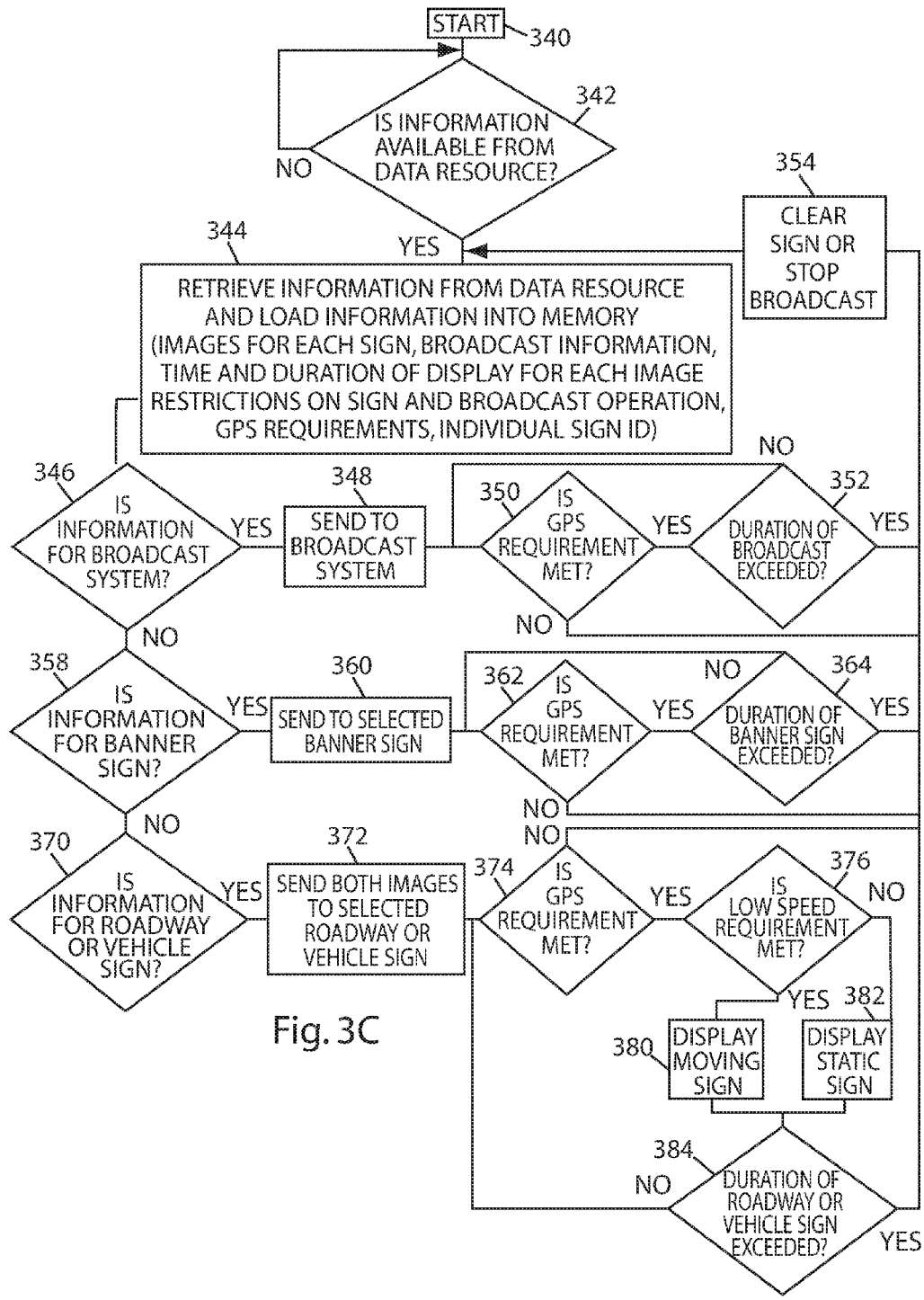
FIG. 3C is a flow chart showing one aspect of operation of a signage system.

FIG. 3C is a flow chart showing the operation of system 135' according to one aspect of the present embodiment. In this example, system 135' is connected to each sign or broadcasting modality previously discussed, i.e., a broadcast system, a banner sign, and a roadway or vehicle sign. After being energized (block 340), computer 145 periodically tests for the availability of data from resource 140, for example once per day at midnight or any other time at which resource 140 and system 135' are operative (block 342). This testing is done via data link 141 (FIGS. 1C and 3B) that connects computer 145 to data resource 140 via satellite, radio, internet, wired connection, and the like. When information is available from data resource 140, it is downloaded via data link 141 to computer 145 where it is stored in memory 150 (bock 344).

Next, computer 145 determines whether the information received is for a broadcast system (block 346) and if so, sends the information to broadcast system 325 (block 348). When information for a broadcast is sent to broadcast system 325, system 135' tests to see if the GPS requirement contained in the broadcast information is met (block 350), i.e., is the broadcast system located within the parameters supplied by the advertiser and relayed through data resource 140. If this is true, system 135' next tests to see if the duration of the broadcast has been exceeded (block 352). If the duration of the broadcast has not been exceeded, control reverts to block 350 and loops through blocks 350 and 352 until either the GPS requirement is not met, i.e., the vehicle is outside the predetermined advertising area, or the predetermined duration of the broadcast has been exceeded. In either case, i.e. if the GPS requirement is not met or the duration of the broadcast has been exceeded. If either of these is true, control advances to block 354 and the broadcast is stopped. After the broadcast is stopped, control reverts to memory 150 to determine if additional broadcasts are stored there and ready for use.

Operation for signage is similar to that for broadcast. While computer 145 continually checks the GPS and duration requirements of the broadcast system (blocks 350 and 352), computer 145 also advances control to block 358 to see if memory 150 contains new information for banner sign 310 (FIG. 3A). If so, this information is sent to the banner sign (block 360). As described above, the GPS and duration requirements are tested (blocks 362 and 364). When the GPS requirement is not met or the required duration of banner sign 310 has been exceeded, control advances to block 354, sign 310 is cleared, and memory 150 of computer 145 is checked for new information.

While computer 145 tests the requirements for banner sign 310 and broadcast system 325, it also tests to see if information is available in memory 150 of computer 145 (block 344) for a roadway or vehicle sign 100 (block 370). If the information is for a roadway or vehicle sign, the information, including both static and moving images, is sent to the sign (block 372). As above, the GPS requirement is tested (block 374) and in this case, the low speed requirement, discussed above, is also tested (block 376). If the low speed requirement is not met, i.e. if the vehicle is moving faster than a predetermined speed or vehicles are moving past a sign 100 at greater than a predetermined speed, the static sign image 130' (FIG. 1, for example) is displayed (block 382). If the low speed requirement is met, i.e. if vehicles are traveling at less than the predetermined speed, a moving sign is shown (block 380). As before, the duration of the sign's image is tested. If the predetermined duration for displaying either sign is exceeded, control advances to block 354, as before and the signage is cleared and readied for the next display. If the duration is not exceeded, control returns to block 374 and loops through blocks 376, 380, 382, and 384 until the duration is exceeded or the GPS requirement is no longer met.

System 135 operates in the same manner as system 135', except the added features of GPS, etc. are not present. The above is but one example of many aspects possible with this embodiment. The actual programming steps are determined by conditions at the location of the signage, advertising demand, local restrictions, and the like.

Repositionable Sign

Figure 4:
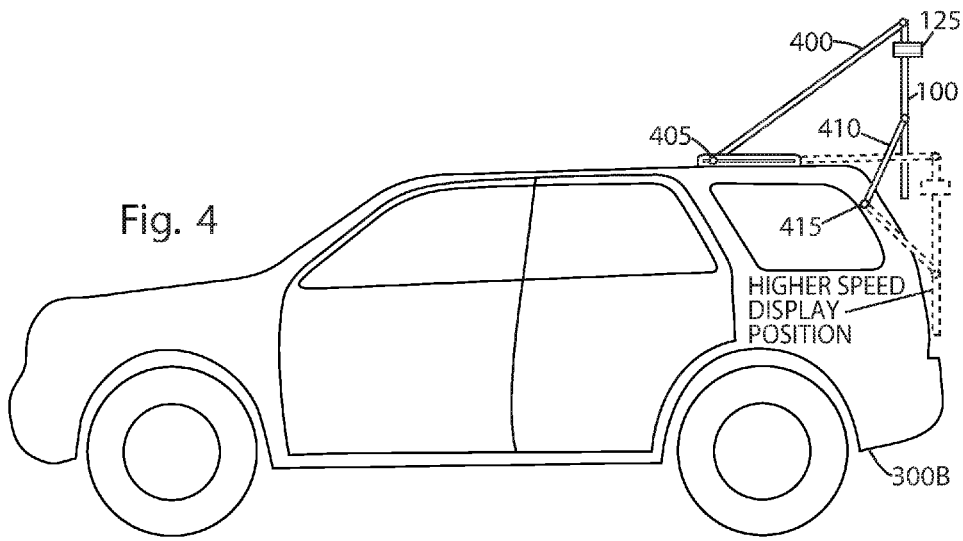
FIGS. 4 and 5 show aspects of movable displays attached to a vehicle.

FIG. 4 shows one aspect of a sign 100 mounted atop a vehicle 300B. Sensor antenna 125 is positioned at or near the top of sign 100 and faces rearward. Sign 100 is secured to one or more bars 400 and deflectors that are secured to the roof of vehicle 300B with a slidable pivot 405. A pivot arm 410 is attached to the side of sign 100 at a first end and a pivot point 415 on vehicle 300B at a second end. Sign 100 is movable between the elevated position shown in solid lines and the lowered position shown in dashed lines. As it moves up and down, sign 100 is held in a somewhat vertical position by arm 410. Sign 100 is in the elevated position when the vehicle moves at a speed below a predetermined threshold, and in the lowered position above the predetermined threshold speed. Sign 100 is moved up and down by a simple mechanism such as a hydraulic or pneumatic cylinder, a motor, or the like (not shown). The raising and lowering mechanism is under control of system 135 or 135', as described above.

Figure 5:
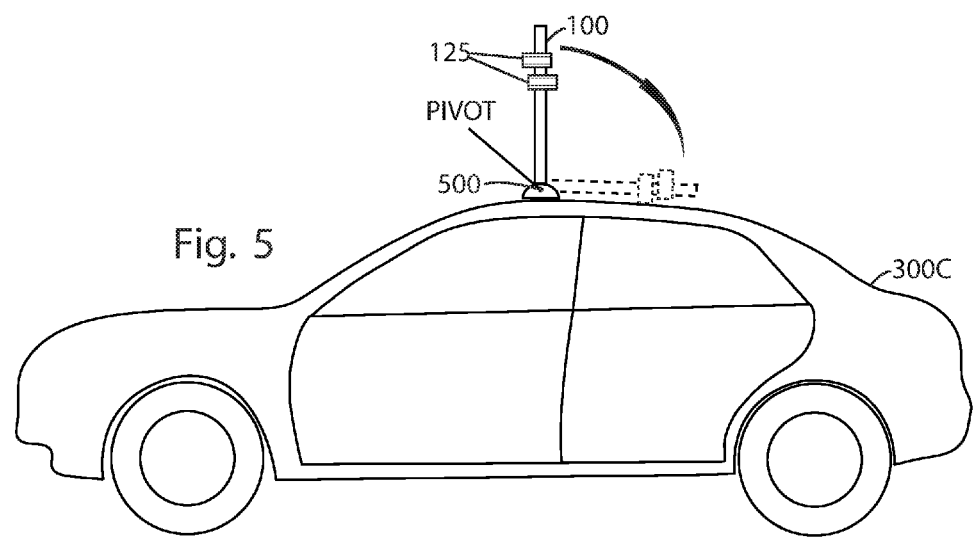

An alternative mounting of sign 100 on a vehicle 300C is shown in FIG. 5. In this aspect, sign 100 pivots about a pivot 500. Sign 100 is urged to move up or down by any of several mechanisms. For example, pivot 500 may contain a spring that allows sign 100 to pivot downward when vehicle 300C is driven forward above a predetermined speed. Alternatively, a motor or cylinder can be used, as discussed in connection with FIG. 4. In this embodiment, sign 100 can face forward or rearward with respect to vehicle 300C. An additional sign 100 can be added so that two signs 100 face both forward and rearward for additional advertising coverage. Sign or signs 100 in this embodiment are controlled by system 135 or 135', as described above.

Figure 6:
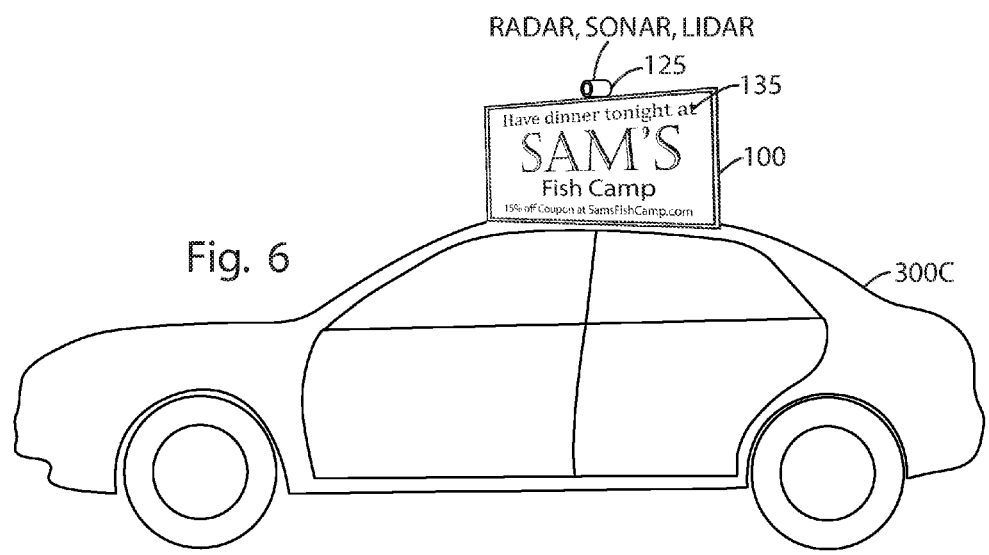
FIG. 6 shows one aspect of a display that is mounted diagonally atop a vehicle.

Sign 100 can be mounted diagonally on a vehicle 300C as shown in FIG. 6. Sign 100 is oriented to face opposing traffic and display 135 is active when traffic is stopped or moving below a predetermined threshold speed, as sensed by sensor 125. A second sign 100 (not shown) can be added and oriented to face traffic on the opposite side of vehicle 300C. A third sign 100 (not shown) can be added and oriented to face toward the rear of vehicle 300. Each sign can be equipped with its own sensor 125 and receive independent data feeds from system 135 (FIG. 3B).

Figure 7:
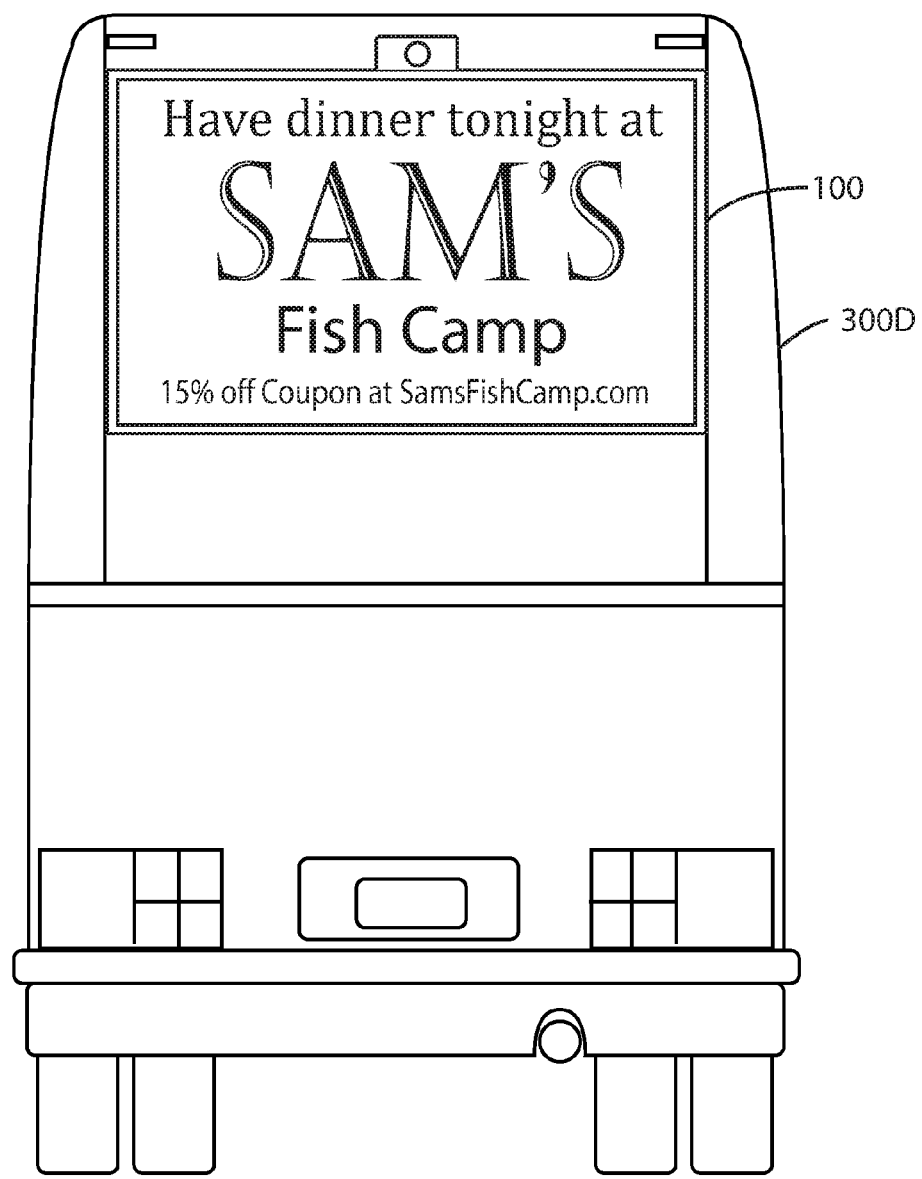

Sign 100 may be mounted on the rear of a bus or recreational vehicle 300D or delivery vehicle 300E as shown in FIGS. 7 and 8.

Figure 9A:
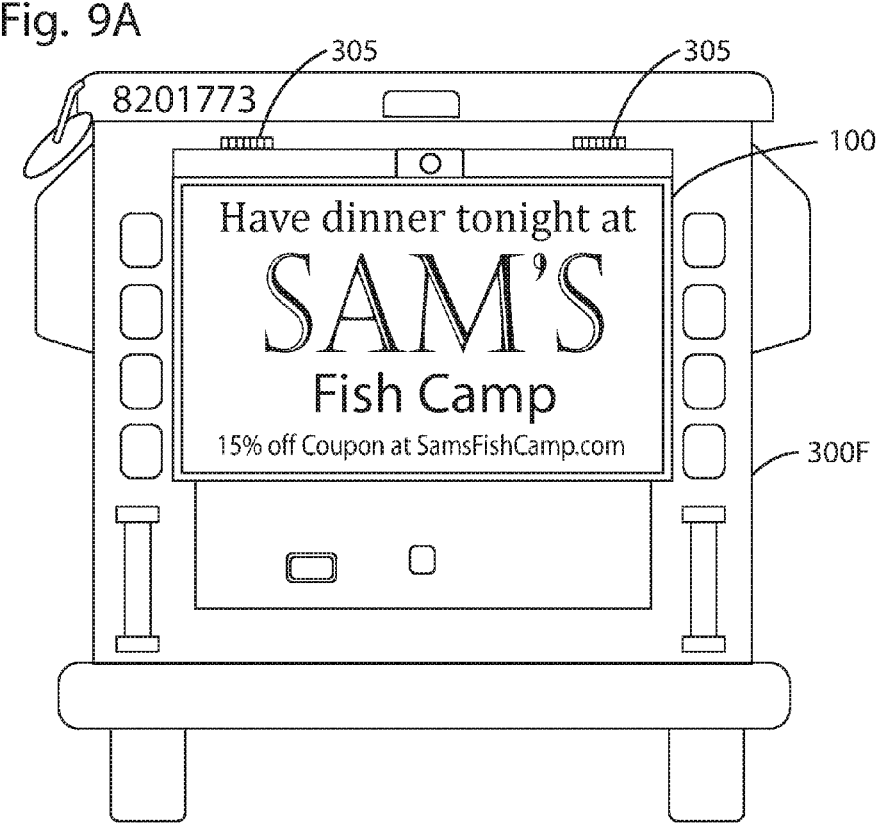
FIGS. 9A and 9B show a swing-away display that is mounted on hinges on a delivery vehicle.
Figure 9B:
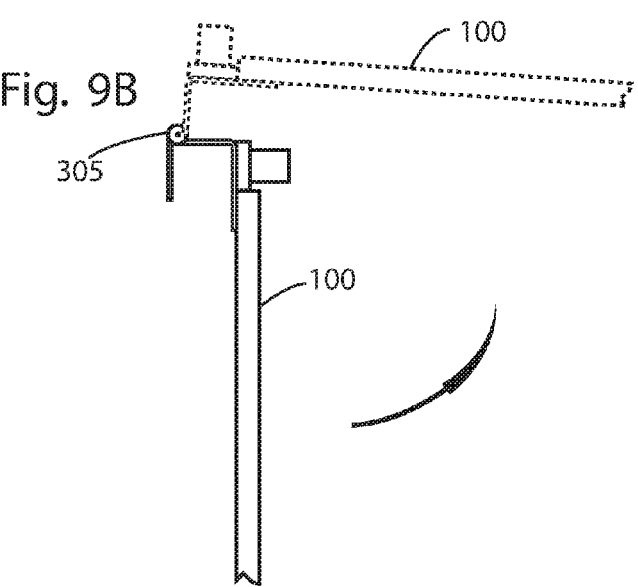

Sign 100 may be secured to the rear of a delivery vehicle 300F by hinges 305, as shown in FIG. 9A. FIG. 9B shows sign 100 in its normal position using solid lines and in its alternate position using dashed lines. Lifting sign 100 to its alternate position permits access to the rear of vehicle 300F.

Figure 10A:
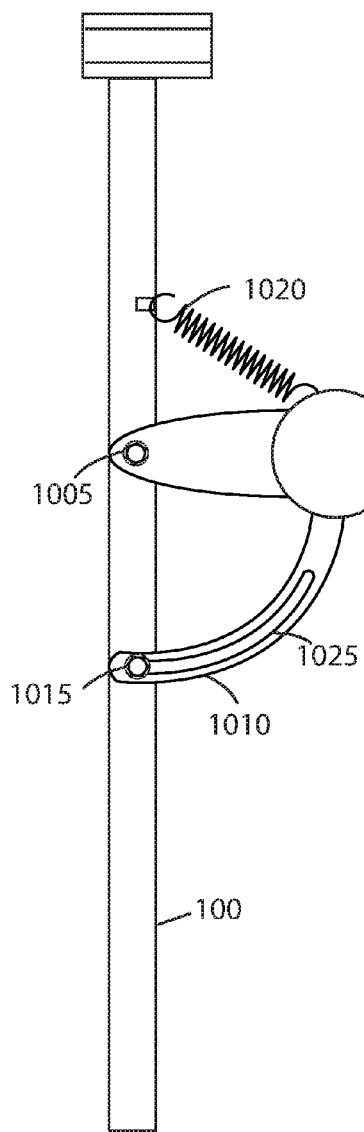
FIGS. 10A and 10B show two positions of a display that is mounted on a pivot.
Figure 10B:
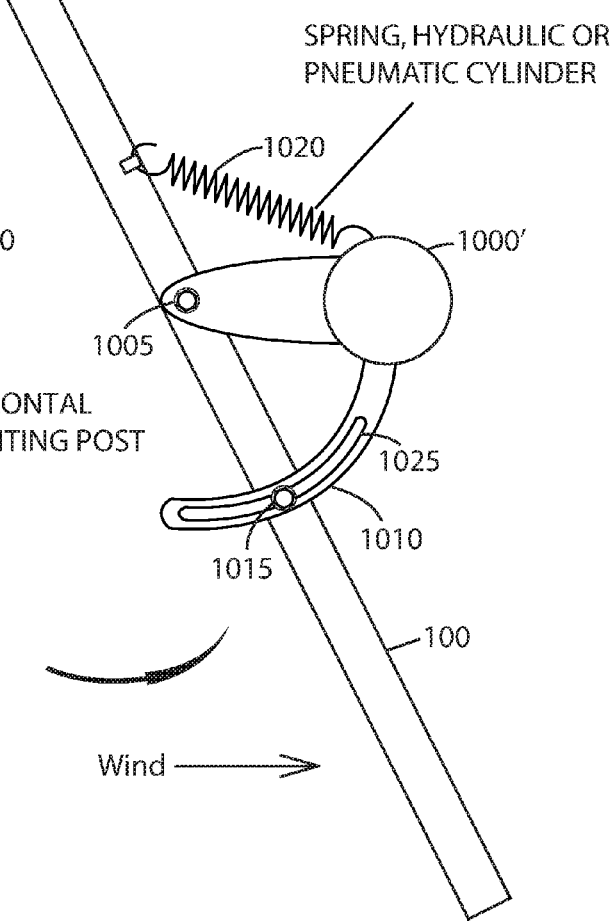

An alternative mounting for sign 100 is shown in FIGS. 10A and 10B. This mounting method is useful when sign 100 will be exposed to strong winds. Tilting sign 100 with respect to the direction of the wind reduces the force of the wind on sign 100 and its mount, reducing the potential for damage to sign 100 and the object, such as the roof of a vehicle or a fixed stanchion, to which sign 100 is secured.

Sign 100 is secured to a post 1000 by a pivot 1005 about which sign 100 can rotate. In the absence of wind, a spring 1020 urges sign 100 to rotate clockwise about pivot 1005. Pivot 1005 is located away from the center of sign 100 so that when wind strikes the front of sign 100, torque about pivot 1005 causes sign 100 to rotate in the direction indicated in FIG. 10B.

A curved, arm 1010 with an interior slot 1025 is secured to post 1000. A pin 1015 is secured to sign 100 and is captive in slot 1025. Pin 1015 moves slidably within slot 1025 as sign 100 rotates about pivot 1005. Pin 1015 normally rests against the lower end of slot 1025, urged there by the counterclockwise torque exerted on sign 100 by spring 1020.

If wind from the left strikes the front of sign 100, it exerts a torque on sign 100 as shown in FIG. 10B by the curved arrow. If the wind partially overcomes the force exerted by spring 1020, sign 100 rotates about pivot 1005. The rotational travel of sign 100 is limited by the available travel of pin 1015 within slot 1025 of arm 1020. When the wind force on sign 100 is below a predetermined amount, spring 1020 urges sign 100 back to a vertical position as shown in FIG. 10A.

Description & Operation—Additional Capabilities of Active Signage

Usage of the signage described above has real advertising value, including the duration of messages, the use of messages targeted to specific locations and specific demographics. The advertisers whose messages are displayed make payment to the managers, licensees, and/or owners of the signs according to these demographics, the duration of display of a message, and so forth. This signage provides an opportunity for small business owners and others to present an advertising message to a highly targeted local market at a cost considerably below TV and other mass media. For example, a small family or carry out restaurant can inform motorists that one kilometer ahead they can pickup dinner on the way home or make reservations. A merchant can make offers for products or services that can be purchased by vehicle occupants and others by cell phone, the Internet, or other means. Such in-vehicle commerce is likely to increase substantially as self-driving vehicles, currently under development, become more commonplace. The effectiveness of such advertising can be measured very quickly.

The nature of the advertising can be used as a demographic on a larger scale. For example, a company with national sales can learn ways to optimize their advertising at new locales by noting the duration and kinds of ads placed by local vendors at other similar locales.

At present, buses and freight-carrying vehicles have built-in GPS devices that relay their location to a central headquarters location. Other information about the vehicle, such as hours of continuous operation, number, duration, and location of stops and the like can be deduced from this information as well. In the future, it is anticipated that vehicles will contain "black box" transponders of a similar nature, including RFID tags, that relay information about the vehicle and its operator to one or more central locations. This information can be gathered by data resource 140 of system 135 or 135' in order to further customize the operation of signs 100, and to gather demographics as well.

Conclusion, Ramifications, and Scope

I have provided an improved advertising display system for use in the vicinity of vehicular traffic. Signs used in my system can convey video information, still information, and can be blank. A sensor comprising radar, sonar, lidar, infrared, vibration, pressure, video or other system senses movement of vehicles in the vicinity of my sign and reports this information to the electronic system that controls the sign. When nearby traffic is moving above a predetermined speed, my sign is caused to be either still or blank. When nearby traffic is stopped or moving below a predetermined speed, my sign displays changing information such as videos or a series of changing images. By operating in this way, my sign maximizes the impact of advertisements while minimizing distraction of nearby drivers. One aspect of my signage system gathers billing information depending on the location and duration of each advertiser's message. In another aspect, my signage system gathers demographic information and reports it to receiving parties through an associated data resource. In another aspect, my signage system uses GPS data to determine where a sign's message is to be displayed for the greatest advertising impact.

My system provides a business method whereby a governmental unit granting display erection rights, and optionally electrical service and traffic control system access, on its property for advertising purposes, shall receive a percentage of the revenue generated by advertising conducted through said display. For example, after a 35% overhead burden is subtracted, all remaining revenue is shared on an equal, or some other, basis between the government and the advertising media operator. Such a public-private partnership is unique, as compared to, for example, franchise fees which cable TV companies pays the local franchising authority for the right to access public rights of way to offer cable service. Effectively serving as a public-private partnership, it shall provide a major revenue stream for municipalities and counties with little or no additional cost to taxpayers. Inasmuch as a display mounted on government property requires an easement, license and or permits of various types and descriptions, it is advantageous to partner with said governments to motivate their participation. My system is a free market concept in that each party contributes something to the whole and neither is parasitic. It shall use existing infrastructure and power sources for display support, which would otherwise cost many millions of dollars and take years to erect. My system is especially of value to densely populated cities suffering from revenue declines, high crime and lack of adequate police and other services shall benefit greatly from a revenue windfall.

Prior art teaches in a direction opposite to Applicant's innovation, disclosing instead a variety of signs intended to attract the attention of occupants in moving vehicles. In so doing, these would almost inevitably contribute to an increase in roadway accidents, injuries and deaths. Applicant's innovation produces clear and unexpected results in presenting an invention that would be acceptable to permitting authorities in avoiding driver distraction. Prior art fails this test as it is highly unlikely that any governmental agency would permit such a system, considering that driver distraction is now a significant cause of highway accidents and deaths.

It is difficult to conceive of a more urgent, long felt and unsolved need than reducing human deaths and crippling injuries directly attributable to unsafe roadway and bridge conditions. As previously noted, "Bad highway design and conditions are a factor in more than half the fatal crashes in the United States, contributing to more deaths than speeding, drunken driving or failure to use seat belts . . . " according to a 2009 study for the Transportation Construction Coalition. "Road-related conditions were a factor in 22,000 fatalities and cost $217.5 billion each year . . . " Over a fifteen year period perhaps well over 300,000 people have died because of poor road conditions and the lack of roadway funding is clearly the direct cause of these deaths.

Many of today's roadways are a clear and present hazard. Certainly there is no higher priority than preserving human life. Rarely, if ever, has there been such a clear and direct solution to such a widespread and tragic problem as presented in the instant innovation.

The lack of success of prior art illustrates the failure of others to provide a practical solution and instead would likely contribute to an increase in roadway deaths with distracting signage. The present innovation, through related funding by advertisers, can provide the financial resources to construct and improve public roadways, directly reducing accidents and the resulting deaths, crippling injuries and heartache of survivors and their loved ones. The advertising industry is one of the greatest revenue generator in today's economy. Google, Inc., for example had total revenue of almost $75 Billion in 2015, about 97% of which was derived from advertising activity. The instant invention has the potential to generate unprecedented advertising income that can be applied to roadway and bridge infrastructure providing very strong financial incentives to governmental units in permitting placement and operation of such signage.

Applicant asserts his innovation to be novel and unobvious, exempt from prior art combinations and therefore patentable. It presents a long felt but unresolved need, teaching away from the direction of the prior art and succeeding where others have universally failed in prior art, dating back many years in this rapidly advancing technological age. It provides a clear and acceptable means for funding of roadway construction and improvements.

It is difficult to imagine a more direct cause and effect relationship between poor roadway conditions with the loss of tens of thousands of lives and a provision of funding that would inevitably flow to governments for the widespread construction, repair and maintenance of our roadways.

As previously noted, "In the 1960s and early 1970s, gas taxes and other fees on drivers covered more than 70 percent of the costs of highway construction and maintenance . . . (today) . . . nearly as much of the cost of building and maintaining highways now comes from general taxes . . . as comes from gasoline taxes or other 'user fees' on drivers. Roads pay for themselves less and less over time. The share of transportation costs covered by gasoline taxes is likely to continue to decline as a result of inflation, more fuel-efficient cars, and slower growth in driving." In effect, this declining provision for road funding is becoming an increasingly greater problem and public resistance to increased taxes reflects little receptivity.

"The American Society of Civil Engineers has concluded that over the next decade, it will cost more than $3.3 trillion to keep up with repairs and replacements to U.S. roads, bridges, airports, power grid and other critical infrastructure, but based on current funding levels, the nation will come up more than $1.4 trillion short. When projected to 2040, the shortfall is expected to top $5 trillion, unless new funds are allocated."

'A recent report from the state Senate said 68 percent of California roads are in poor or mediocre condition, the 44th worst record in the nation. It also said the cost for all of the unfunded repairs identified by state and local officials in the coming decade is about $135 billion . . . . If more money isn't found, "these roads will disintegrate to the point where they'll have to be rebuilt, which is very, very expensive," . . . . The state transportation department, Caltrans, estimates every dollar spent on preventive maintenance today averts as much as $10 in repairs later . . . . If motorists do pay more in taxes and fees, they may be disappointed to hear that the money will do little to improve their biggest complaint about roads—traffic. The money under discussion is primarily to keep roads, bridges and related infrastructure like culverts from falling apart, not relieve traffic.'

Applicant's innovation presents a clear and acceptable solution to this growing problem, providing roadway funding without direct cost to taxpayers. All equipment and operational costs can be borne by the private partner and operational entity. Funding paid by advertisers can provide unprecedented income for public infrastructure construction and maintenance.

Importantly, Applicant's system provides a highly equitable funding system for roadway infrastructure construction and maintenance in that the users effectively, through exposure to advertising, provide a substantial source of funding. Effectively similar to fuel tax, the more miles driven shall generally result in more exposure to advertising.

Such a medium can also provide valuable services to vehicle occupants with information on local food, lodging, merchandise and recreational facilities, heretofore not readily available. Smaller businesses can be helped by accessing lower cost highly localized advertising.

While the above description contains many specificities, these should not be construed as limitations on the scope, but as exemplifications of some present embodiments. Many other ramifications and variations are possible within the teachings. Additional features can be added, such as a sound system that provides audible information to nearby drivers and pedestrians. My sign can be used to provide roadway information such as notification of accidents or traffic ahead, child protection information, and the like. My sign can be used singly or with other signs and it can range from large to small. It can be used to display three-dimensional anaglyphs. The information can be displayed in monochrome or full color.

Thus the scope should be determined by the appended claims and their legal equivalents, rather than the examples and particulars given.

What is claimed is:

1. A roadway signage system, comprising:
   at least one motion sensor;
   a directional viewing sign including a display, the display having limited viewing angles in which the display is viewable to observers in at least two vehicles at a range of distances from the directional viewing sign;

memory communicatively connected to the directional viewing sign, the memory storing instructions that, when executed by one or more processors, cause the one or more processors to perform operations comprising:

determining, based at least in part on receiving data from the at least one motion sensor, an average speed of the at least two vehicles within the limited range of vertical viewing angles;

outputting for display on the directional viewing sign and based at least in part on the average speed of the at least two vehicles being less than a threshold speed, a dynamic image; and outputting for display on the directional viewing sign and based at least in part on the average speed of the at least two vehicles being greater than the threshold speed, a static image.

2. The roadway signage system of claim 1, wherein the directional viewing sign comprises at least one of a single-view sign, a multi-directional viewing sign, a sign with a privacy filter thereon, or other directional viewing signs that are located and arranged such that viewing of the directional sign is limited to occupants of vehicles within the limited vertical viewing angles.

3. The roadway signage system of claim 1, wherein the static image includes at least one of static advertising, static roadway informational images, static emergency information images, blank images, or dark images.

4. The roadway signage system of claim 1, wherein the at least one motion sensor comprises at least one of radar, sonar, lidar, infrared, video, magnetic, vibration, RFID, pressure sensors, or other optical or magnetic sensor.

5. The roadway signage system of claim 1, wherein the directional viewing sign further includes a traffic control signal with an integrated timer coordinated display.

6. The roadway signage system of claim 1, further comprising an interface, and wherein the one or more processors further perform operations comprising broadcasting, via the interface, an audio signal associated with at least one of the static image or the dynamic image, wherein the audio signal is broadcasted over one or more of FM, AM, television, satellite, on line, or a cellular network.

7. The roadway signage system of claim 1, further comprising a plurality of shutters attached to the directional viewing sign, wherein the plurality of shutters are arranged to block a portion of the display from view of vehicles that are outside the range of distances from the directional viewing sign while not blocking the portion of the display from view of vehicles that are within the range of distances from the directional viewing sign.

8. The roadway signage system of claim 1, further comprising a drive assembly coupled to the directional viewing sign and configured to tilt the directional viewing sign a predetermined amount to adjust the display, and wherein the one or more processors are further configured to perform operations comprising instructing the drive assembly to tilt the directional viewing sign the predetermined amount.

9. The roadway signage system of claim 1, further comprising at least one camera, and wherein the one or more processors are further configured to perform operations comprising determining, based at least in part on receiving data from the at least one camera, at least one of facial recognition of the observers in the at least two vehicles, license plates of the at least two vehicles, or make and model of the at least two vehicles.

10. The roadway signage system of claim 1, further comprising a transponder communicatively coupled to the one or more processors, and wherein the one or more processors further perform operations comprising sending, by the transponder and to a data resource external to the directional viewing sign, demographic information of an occupant of at least one of the at least two vehicles.

11. A roadway signage system, comprising:

a directional viewing sign mounted over a roadway, the directional viewing sign including a display having viewing angles;

a privacy filter coupled to the directional viewing sign, wherein the privacy filter limits the viewing angles of the directional viewing sign so as to display at least a first image that is viewable at a predetermined range of vertical viewing angles from the directional viewing sign such that an occupant of at least one vehicle that is within the predetermined range of vertical viewing angles from the directional viewing sign is able to view the first image, but occupants of vehicles not within the predetermined range of vertical viewing angles from the directional viewing sign are not able to view the first image;

a data resource providing at least the first image;

an electronic control system comprising a memory and a computer for communicating between the directional viewing sign, the data resource, and the memory, the electronic control system configured to cause the directional viewing sign to display the first image;

at least one motion sensor arranged to detect speed of the at least one vehicle on the roadway within the predetermined range of vertical viewing angles from the directional viewing sign, wherein when no vehicle within said predetermined range has a speed greater than a predetermined rate, the directional viewing sign displays a dynamic image, and wherein when at least one vehicle has a speed greater than the predetermined rate, the directional viewing sign displays a static image.

12. The roadway signage system of claim 11, wherein the at least one motion sensor includes at least one of radar, sonar, lidar, infrared, video, magnetic, vibration, RFID, pressure sensors, or other optical or magnetic sensor.

13. The roadway signage system of claim 11, further comprising a drive assembly coupled to the directional viewing sign and configured to tilt the directional viewing sign a predetermined amount to adjust the display, and wherein the drive assembly, when instructed by the electronic control system, tilts the directional viewing sign the predetermined amount.

14. A method for displaying information on a display that is in a vicinity of a vehicular roadway, the method comprising:

determining that there are vehicles within a limited range of vertical viewing angles relative to the display;

determining speeds of multiple vehicles on the vehicular roadway that are within the limited range of vertical viewing angles;

identifying a first number of vehicles from the multiple vehicles that have speeds less than a threshold speed and a second number of vehicles from the multiple vehicles that have speeds greater than the threshold speed;

causing, based at least in part on the first number of vehicles being greater than a first predefined number of vehicles and the second number of vehicles being less than a second predefined number of vehicles, the display to display a first image; and causing, based at least in part on the second number of vehicles being greater than the second predefined number of vehicles, the display to display a second image, the second image being different than the first image.

15. The method of claim 14, wherein at least one the first image or the second image includes advertising content, and the method further comprises:
   determining an amount of time that the advertising content was displayed; and
   processing, for payment, a cost associated to display the advertising content.

16. The method of claim 14, wherein determining the speeds of the multiple vehicles is based at least in part on input from at least one radar, sonar, lidar, infrared, video, magnetic, vibration, RFID, pressure sensors, or other optical or magnetic sensor.

17. The roadway signage system of claim 1, the operations further comprising determining a number of vehicles within the limited range of vertical viewing angles, and wherein:
   outputting the dynamic image is based at least in part on a predefined number of vehicles having a speed less than the threshold speed, wherein the predefined number of vehicles is at least two vehicles; and
   outputting the static image is based at least in part on the predefined number of vehicles having a speed greater than the threshold speed.

18. The method of claim 14, further comprising adjusting the privacy filter to change the limited range of vertical viewing angles.

19. The method of claim 14, further comprising receiving, from a remote computing device, data representing content to be displayed, wherein the data includes at least one of the first image or the second image.

20. The method of claim 14, wherein determining that there are vehicles within the limited range of vertical viewing angles is based at least in part on input from at least one of an optical sensor, magnetic sensor, force sensor, pressure sensor, or vibration sensor.

* * * * *